(12) United States Patent
Nitzberg et al.

(10) Patent No.: US 12,462,803 B2
(45) Date of Patent: *Nov. 4, 2025

(54) INTERACTIVE VOICE SYSTEM FOR CONVEYOR CONTROL

(71) Applicant: Intelligrated Headquarters, LLC, Mason, OH (US)

(72) Inventors: Jason-David Nitzberg, Batavia, OH (US); Timothy R. Williams, Middletown, OH (US); Zachary Reott, Monroeville, PA (US); Sang Pheng, Cincinnati, OH (US); Lori A. Pike, Murrysville, PA (US); Jason A Johnson, Hamilton, OH (US); Jeffrey P. Pike, Murrysville, PA (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,151

(22) Filed: Jan. 23, 2024

(65) Prior Publication Data

US 2024/0161745 A1 May 16, 2024

Related U.S. Application Data

(63) Continuation of application No. 17/185,343, filed on Feb. 25, 2021, now Pat. No. 11,915,694.

(51) Int. Cl.
*G10L 15/22* (2006.01)
*B65G 43/00* (2006.01)

(52) U.S. Cl.
CPC .............. *G10L 15/22* (2013.01); *B65G 43/00* (2013.01); *B65G 2203/0266* (2013.01)

(58) Field of Classification Search
CPC .. G10L 15/22; B65G 43/00; B65G 2203/0266
See application file for complete search history.

(56) References Cited

U.S. PATENT DOCUMENTS

| 5,345,538 A | 9/1994 | Narayannan et al. |
| 5,620,102 A | 4/1997 | Finch, Jr. |

(Continued)

FOREIGN PATENT DOCUMENTS

EP 3825932 A1 5/2021

OTHER PUBLICATIONS

U.S. Appl. No. 17/185,343, filed Feb. 25, 2021, 2022/0270599, Issued.

(Continued)

*Primary Examiner* — Brian L Albertalli
(74) *Attorney, Agent, or Firm* — Alston & Bird LLP

(57) ABSTRACT

A voice control interactive system and method to provide a hands-free operation for the operator to monitor and control multiple conveyors in a warehouse. The system comprises a first computing device and a second computing device. The first computing device is configured to receive a transmission from the second computing device, the transmission including information relating to a verbal command spoken by an operator associated with the second computing device. The first computing device is configured to generate a response signal in response to the transmission. The response signal includes information relating to a response for the verbal command. The information is generated based on a location of the second computing device. Generating the response signal includes identifying an optimal route information for the second computing device to reach a location of the first computing device.

19 Claims, 11 Drawing Sheets

(56) References Cited

U.S. PATENT DOCUMENTS

| | | |
|---|---|---|
| 6,418,199 B1 | 7/2002 | Perrone |
| 7,391,863 B2 | 6/2008 | Viduya et al. |
| 9,199,802 B2 | 12/2015 | Neiser et al. |
| 9,503,843 B2 * | 11/2016 | Tofighbakhsh ......... H04W 4/02 |
| 9,738,455 B2 | 8/2017 | Neiser et al. |
| 9,795,995 B2 | 10/2017 | Zimmer et al. |
| 10,152,968 B1 | 12/2018 | Agrusa et al. |
| 10,304,017 B2 | 5/2019 | Lee et al. |
| 11,156,471 B2 | 10/2021 | Gil |
| 2003/0046083 A1 | 3/2003 | Devinney et al. |
| 2004/0030750 A1 * | 2/2004 | Moore ................ H04M 7/1265 709/204 |
| 2004/0181467 A1 | 9/2004 | Raiyani et al. |
| 2005/0010418 A1 | 1/2005 | McNair et al. |
| 2010/0063821 A1 | 3/2010 | Marsh et al. |
| 2011/0137587 A1 | 6/2011 | Rothlisberger et al. |
| 2013/0322634 A1 * | 12/2013 | Bennett ................... H04R 5/04 704/274 |
| 2015/0296341 A1 * | 10/2015 | Cecchini ................ H04L 67/75 455/566 |
| 2015/0364138 A1 | 12/2015 | Kamalakannan et al. |
| 2016/0125895 A1 | 5/2016 | Gandhi et al. |
| 2019/0062054 A1 | 2/2019 | Nemati et al. |
| 2019/0339918 A1 | 11/2019 | Boule et al. |
| 2020/0075027 A1 | 3/2020 | Arantes et al. |
| 2020/0290820 A1 | 9/2020 | Pinel et al. |
| 2021/0158241 A1 | 5/2021 | Nashif |
| 2021/0312422 A1 | 10/2021 | Lee et al. |

OTHER PUBLICATIONS

Non-Final Rejection Mailed on Jun. 23, 2023 for U.S. Appl. No. 17/185,343, 15 page(s).

Notice of Allowance and Fees Due (PTOL-85) Mailed on Nov. 3, 2023 for U.S. Appl. No. 17/185,343, 7 page(s).

* cited by examiner

INTERACTIVE VOICE SYSTEM FOR CONVEYOR CONTROL

CROSS REFERENCE TO RELATED APPLICATION

This application is a continuation of U.S. application Ser. No. 17/185,343, filed Feb. 25, 2021, which is hereby incorporated by reference in its entirety.

TECHNICAL FIELD

Example embodiments of the present invention relate generally to a material handling system for handling articles and to voice interaction with a machine control system for conveyors in the material handling system.

BACKGROUND

Conventionally, in material handling environments, multiple conveyors can be arranged for transporting articles from one place to another. These articles may be consumer goods, packaged boxes, cases, items, cartons, and/or the like that are to be transported on such conveyors from a source location to a destination location. Conveyors used for transporting articles generally include a pick area, transport conveyors, a merge conveyor, and a sortation conveyor that sorts articles onto a plurality of takeaway conveyors that subsequently transport the articles to their intended destination. Such conveyors are usually controlled using dedicated controllers for each conveyor. Generally, the statuses of these conveyors are monitored by an operator using a user interface positioned within the vicinity of these conveyors such that the operator can identify any operational failures occurring at the conveyor.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a voice control interactive method. The method includes receiving an audio signal generated by a second computing device and generating a control signal and a response signal in response to the audio signal. The audio signal comprises information relating to a verbal command spoken by an operator associated with the second computing device. The response signal comprises information relating to a response for the verbal command, wherein the information is generated based on the location of the second computing device. The method further includes controlling a conveyor based on the control signal and transmitting the response signal to the second computing device as one of a speech output or a visual output indicating the information relating to the response for the verbal command to the operator.

Various example embodiments described herein relate to a voice control interactive method, wherein generating the response signal further includes: identifying an optimal route information for the second computing device to reach a location of a first computing device and transmitting to the second computing device the optimal route information. The method further includes modifying the optimal route information based on a current location of the second computing device.

Various example embodiments described herein relate to a voice control interactive method, wherein generating the response signal further includes: retrieving a location information of one or more components on the conveyor identified in the verbal command and associated with the first computing device. The method further includes identifying the optimal route information for the second computing device to reach the location of the one or more components based on the location information and transmitting to the second computing device the optimal route information. The method further includes modifying the optimal route information based on the current location of the second computing device.

Various example embodiments described herein relate to a voice control interactive method, wherein controlling the conveyor based on the control signal further includes analyzing the information encrypted in the audio signal and determining the location of the second computing device issuing the audio signal, wherein when the location is within a predetermined range from the first computing device, the method further includes issuing a first control signal to the one or more components associated with the conveyor identified in the audio signal, wherein the first control signal is a command signal to one of activate, deactivate, or modify control settings of the conveyor. The method further includes issuing a first response signal to the second computing device, wherein the first response signal indicates a status information of the conveyor after issuing the first control signal.

Various example embodiments described herein relate to a voice control interactive method, wherein controlling the conveyor based on the control signal further includes analyzing the information encrypted in the audio signal and determining the location of the second computing device issuing the audio signal, wherein when the location is outside the predetermined range from the first computing device, the method further includes issuing the response signal to the second computing indicating an error information comprising the location information of the one or more components identified in the audio signal, the location of the second computing device, and a distance information between the one or more components and the second computing device.

Various example embodiments described herein relate to a voice control interactive method, wherein controlling the conveyor based on the control signal further includes analyzing the information encrypted in the audio signal and determining the location of the second computing device issuing the audio signal; wherein when the location is within the predetermined range from the first computing device, the method further includes issuing the response signal to the second computing indicating the operator associated with the second computing device to provide a confirmation of the information encrypted in the audio signal before issuing the first control wherein the confirmation is provided as one of a speech input or a text input.

Various example embodiments described herein relate to a voice control interactive method, wherein transmitting the response signal further includes displaying the response signal at the second computing device as the visual output in the form of a visual interactive screen with a list of options, wherein the list of options is selected by the operator by interacting with the second computing device via one of the speech input or the text input.

Various example embodiments described herein relate to a voice control interactive method. The method includes receiving a response signal generated by a first computing device and generating a visual output or a speech output based on an information encrypted in the response signal. The information relates to a conveyor and components associated with the first computing device. The method further includes outputting the visual output or the speech output at a visual interface or a voice interface representing the information encrypted in the response signal and receiving an audio signal through the voice interface from the operator associated with the second computing device in response to the information displayed at the visual interface, wherein the audio signal comprises information relating to a verbal command spoken by the operator. The method further includes transmitting the audio signal to the first computing device.

Various example embodiments described herein relate to a voice control interactive method, wherein outputting the visual output at the visual interface further includes retrieving, from a data store, a first interactive screen from among a plurality of interactive screens associated with the information encrypted in the response signal and displaying, at a display associated with the second computing device, the first interactive screen, wherein the first interactive screen comprises a first list of options to be selected by the operator. The method further includes displaying, at the display associated with the second computing device, a second interactive screen with a second list of options retrieved based on the selection received on the first interactive screen, wherein the selection is provided through one of the visual interface or the voice interface.

Various example embodiments described herein relate to a voice control interactive method, wherein outputting the visual output at the visual interface further includes receiving the speech output from the voice interface associated with the second computing device and retrieving an interactive screen with a list of options associated with the speech output. The method further includes displaying the interactive screen at the visual interface.

Various example embodiments described herein relate to a voice control interactive method, wherein outputting the visual output at the visual interface further includes receiving the speech output from the voice interface associated with the second computing device and analyzing the speech output and dynamically displaying words associated with the speech output at the visual interface, wherein a list of options is generated based on the words associated with the speech output. The method further includes dynamically creating an interactive screen with the list of options and storing the interactive screen as template associated with the speech output.

Various example embodiments described herein relate to a voice control interactive method, wherein outputting the visual output at the visual interface further includes simultaneously reading and displaying the information encrypted in the response signal through the voice interface and the visual interface.

Various example embodiments described herein relate to a voice control interactive method, wherein the information, relating to the conveyor and the components comprise status information, location information, configuration settings, measurements recorded in the data store of the first computing device, commissioning information or acknowledgement information.

Various example embodiments described herein relate to a voice control interactive method, wherein outputting the visual output at the visual interface further includes displaying an emulation screen on the visual interface to monitor conditions of the conveyor and the components while the operator interacts with the interactive screen using the voice interface and the visual interface.

Various example embodiments described herein relate to a voice control interactive method, wherein the verbal commands comprise control commands to control/change the settings of the conveyor and the components, query commands to retrieve the information relating to the conveyor and the components, and login commands to establish a connection with the first computing device.

Various example embodiments described herein relate to a voice control interactive method, wherein receiving the audio signal through the voice interface further includes processing the verbal command of the audio signal to determine if the verbal command is linked to any interactive screens stored in a database and displaying the interactive screen on the visual interface upon determining that the verbal command is linked to an interactive screen in the database. The method further includes displaying a confirmation message of the verbal command on the visual interface upon determining that the verbal command is not linked to any interactive screens and transmitting the verbal command to the first computing device upon receiving a response to the confirmation message through the voice interface.

Various example embodiments described herein relate to a voice control interactive system. The voice interactive system includes a first computing device and a second computing device communicably coupled to the first computing device through wireless networks, wherein the first computing and the second computing device includes one or more conversion engines and processors configured to retrieve information from a database and execute the method claims 1 to 16.

Various example embodiments described herein relate to a voice control interactive system, wherein the first computing device is a conveyor controller communicably coupled to the components configured to control one or more operations of the conveyor.

Various example embodiments described herein relate to a voice control interactive system, wherein the second computing device is a handheld computing device, and wherein the visual interface is a display of the handheld computing device and the voice interface is a headset with a microphone.

Various example embodiments described herein relate to a voice control interactive system, wherein one or more conversion engines comprise a text-to-speech (ITS) module and a speech-to-text (STD module.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
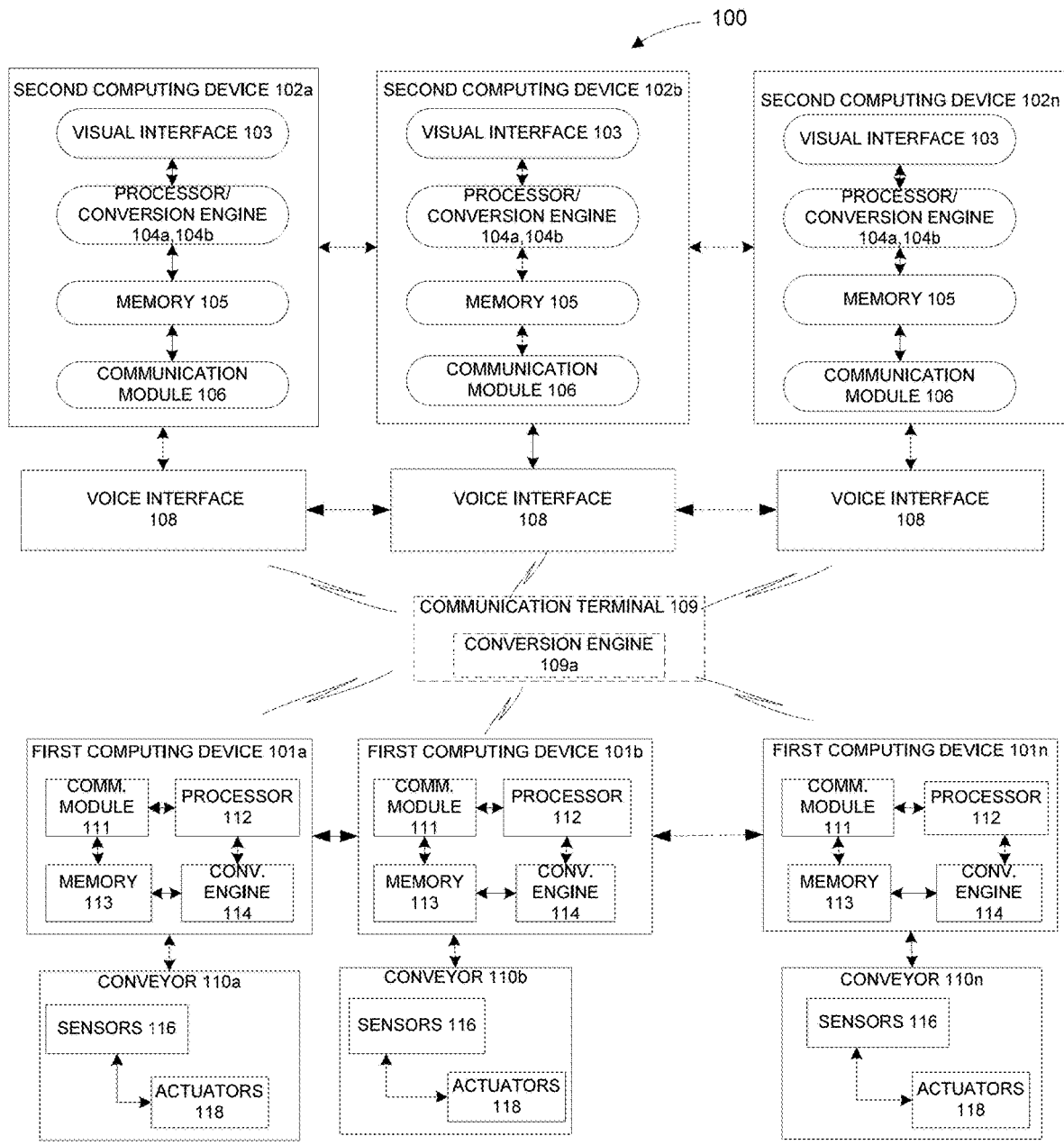
FIG. 1 illustrates a schematic block diagram of a voice control interactive system in accordance with an embodiment of the present invention.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

The term "processor" is used herein to refer to devices which can be configured to perform the various functionality set forth in this disclosure, either individually or in combination with other devices. Examples of processors may include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The term "processing system" may be used to refer to one or more processors, which may be included in a single device, or distributed among multiple physical devices.

According to the present subject matter, the term "module" or "component" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by the processor; other suitable hardware components that provide the described functionality; or a combination of some or all of the above, such as in a system-on-chip.

For the purposes of this specification, it will be understood that a "conveyor" may refer to a device for conveying a plurality of articles in a conveyed direction in one or more paths/lanes, or one or more of the individual paths/lanes along which multiple articles are driven, irrespective of how many separate drive mechanisms are used to convey the articles along those paths/lanes. In some embodiments, a plurality of conveying lanes paths may be parallel, although in some embodiments, the lanes may not be parallel.

It will also be understood that various embodiments of the methods and conveying systems disclosed herein are not limited to conveying systems that transport articles of any size or shape. While the accompanying drawings depict articles that are only square or rectangular, this is only for purposes of illustration, and it will be understood that the conveying systems and methods disclosed herein are equally applicable for transporting articles having different shapes and sizes. It will also be understood that the conveyor systems and methods disclosed herein are applicable to a variety of different conveyor types, such as belt conveyors, roller conveyors, and the like.

Further, the term "article" may indicate an object, thing, item, unit, piece of merchandise, commodity, product, good, or an entity synonymous with the definition provided.

Further, the various principles disclosed herein may be applied to multiple feed conveyors that may be controlled in accordance with the principles disclosed herein. Also, the various principles disclosed herein may also be applied to only a single feed conveyor, if desired, thereby enabling the principles to be applied to a wide variety of different conveying system layouts and facilities having a single feed conveyor and/or multiple feed conveyors.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including" and variants thereof are used in either the detailed description or the claims, these terms are intended to be inclusive in a manner similar to the term "comprising."

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

Similarly, various requirements are described which may be requirements for some embodiments but not other embodiments.

Moreover, the word "exemplary" is used herein to mean "serving as an example, instance, or illustration." Any implementation, aspect, or design described herein as "exemplary" is not necessarily to be construed as preferred or advantageous over other implementations, aspects, or designs. Rather, use of the word exemplary is intended to present concepts in a concrete fashion.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, feature, protocol, or concept names are utilized. Thus, each term utilized herein is to be given its broadest interpretation given the context in which that term is utilized.

As used in this application, the terms "component", "controller", "system", "circuitry", "engine" and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer-readable storage media having various data structures stored thereon. The component may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated as software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multi-thread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance a performance of user equipment. A processor also can be implemented as a combination of computing processing units.

In the subject specification, terms such as "memory", "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRAM). Additionally, the disclosed memory components of systems or methods herein are intended to comprise, without being limited to comprising, these and any other suitable types of memory.

In the subject specification, terms such as 'verbal command', 'control command', 'spoken word', 'speech input', 'speech utterance' refers to predefined words spoken or uttered by the operator through a microphone of a computing device or a headset. Such predefined words may be decoded at the computing device or by a remote server in communication with the computing device.

In particular and in regard to the various functions performed by the above described components, devices, circuits, systems and the like, the terms (including a reference to a "means") used to describe such component are intended to correspond, unless otherwise indicated, to any component which performs the specified function of the described component (e.g., a functional equivalent), even though not structurally equivalent to the disclosed structure, which performs the function in the herein illustrated example aspect of the embodiments. In this regard, it will also be recognized that the embodiments comprise a system as well as a computer-readable medium having computer-executable instruction for performing the acts and/or events of the various methods.

Computing devices typically comprise a variety of media, which can comprise "computer-readable storage media" and/or "communications media," which two terms are used herein differently from one another as follows. "Computer-readable storage media" can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tapes, magnetic disk storage or other magnetic storage devices, or other tangible and/or non-transitory media which can be accessed by one or more local or remote computing devices, e.g., via access requests, queries or other data retrieval protocols, for a variety of operations with respect to the information stored by the medium.

Methods, apparatuses, systems, and computer program products of the present invention may be embodied by any of a variety of devices. For example, the method, apparatus, system, and computer program product of an example embodiment may be embodied by a networked device, such as a server or other network entity, configured to communicate with one or more devices, such as the one or more sensors or the one or more zone control modules associated with an accumulation conveyor. Additionally, or alternatively, the computing device or controller may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices. Still further, example embodiments may be embodied by devices utilizing IoT (Internet of Things) or IIoT (Industrial Internet of Things) technology. In still further embodiments, the method, apparatus, system, and computer program product of an example embodiment may be embodied in, have access to, or otherwise be associated with a gateway device or cloud-based platform.

Generally, a conveyor is monitored by an operator visually using a human-machine interface positioned within a nearby vicinity of the conveyor such that the operator can identify any operational failures occurring at the conveyor. In certain warehouse arrangements, the human-machine interface may be at a remote location away from a physical location of conveyors such that an operator can visualize operations of multiple conveyors from the remote location to identify any operational failures occurring at the conveyors. The operational failure can be a jam condition, a sensor/actuator malfunction, conveyor belt slip/mistracking/tear, a conveyor controller failure, etc. In such a scenario, the operational failures require the operator to travel to a specific physical location of the conveyor to inspect the type of operational failure and resolve the operational failure. In this regard, when the operator is at the remote location it may be difficult for the operator to identify and reach the specific physical location of the warehouse due to the distance from the remote location and layout of the warehouse. In certain warehouse arrangements, the specific location of the conveyor may be notified to the operator via the human-machine interface, however, the operator may not be aware of a route to reach the specific location which leads to an increase in time in reaching the specific location, thereby, leading to a delay in correcting the operational failure. Therefore, the physical presence of the operator can be necessary for inspecting and correcting the operational failure. In certain warehouse arrangements, the human-machine interface at the remote location has to be accessed for every operational failure occurring at multiple places on multiple conveyors at the warehouse. In such scenarios, the operator may have to travel back and forth to the remote location and physical location of the conveyor to identify the faulty conveyors and correct the operational failures. However, in certain warehouse arrangements, the operator may be provided with a portable human-machine interface to identify the faulty conveyors in the warehouse, however, such portable human-machine interface may pose a difficulty if the operator has to perform maintenance on the conveyor using physical tools. Therefore, hands-free maintenance operation is not feasible due to use of both the physical tools and the portable human-machine interface.

Further, in certain warehouse arrangements, when the operator has to monitor a particular conveyor zone of the conveyor, the operator may be required to toggle between multiple visual screens in the portable human-machine interface to identify and select the particular conveyor zone the operator intends to monitor. After identifying and selecting the particular conveyor zone, if the operator is required to change a configuration setting of the particular conveyor zone or activate the particular zone, the operator has to travel to the particular zone and connect the portable human-machine interface to the conveyor controller and change the configuration setting through the portable human-machine interface or press a physical button to activate the particular conveyor zone. Therefore, the process of identifying, selecting, and activating or changing the configuration is time consuming with increased effort by the operator in handling the human-machine interface and travelling to the physical location. In this regard, a throughput of the warehouse is greatly reduced due to a time lag involved in identifying, inspecting, maintaining, and controlling multiple conveyors at the warehouse.

Through applied effort, ingenuity, and innovation, many of the above identified problems have been solved by developing solutions that are included in embodiments of the present disclosure, many examples of which are described in detail herein. The present disclosure relates to a voice control interactive system which provides a hands-free operation for the operator to monitor and control multiple conveyors in a warehouse. The system comprises a first computing device and a second computing device. The first computing device receives an audio signal generated by a second computing device and generates a control signal and a response signal in response to the audio signal. The audio signal comprises information relating to a verbal command spoken by an operator associated with the second computing device. The response signal comprises information relating to a response for the verbal command, wherein the information is generated based on the location of the second computing device. The control signal comprises information to control a conveyor. Further, the first computing device transmits the response signal to the second computing device as one of a speech output or a visual output indicating the information relating to the response for the verbal command to the operator.

According to an embodiment, the first computing device is a conveyor controller communicably coupled to the components configured to control one or more operations of the conveyor.

According to an embodiment, the second computing device is a handheld computing device, and wherein the visual interface is a display of the handheld computing device and the voice interface is a headset with a microphone.

According to an embodiment, the second computing device receives the response signal generated by the first computing device and generates a visual output or a speech output based on the information encrypted in the response signal. The response signal comprises information relating to a conveyor and components associated with the first computing device. The visual output or the speech is outputted at the visual interface or the voice interface representing the information encrypted in the response signal. Further, the second computing device receives another audio signal through the voice interface from the operator in response to the information displayed at the visual interface, wherein the other audio signal comprises information relating to a verbal command spoken by the operator.

According to an embodiment, the verbal commands comprise control commands to control/change the settings of the conveyor and the components, query commands to retrieve the information relating to the conveyor and the components, and login commands to establish a connection with the first computing device.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Throughout this specification, the term "audio signal" may refer to a signal which is processed and encrypted/encoded with verbal commands spoken by the operator. The audio signal may be digital signals decoded/decrypted using any suitable conversion circuits known in the art.

Throughout this specification, the term "response signal" may refer to a signal which is processed and encrypted/encoded with information generated in response to the verbal commands spoken by the operator. The response signals may be digital signals decoded/decrypted using speech recognition modules. The response signal may be digital signals decoded/decrypted using any suitable conversion circuits known in the art.

Throughout this specification, the term "control signal" may refer to a signal processed and encrypted/encoded with information for controlling and configuring the conveyor in response to the verbal commands spoken by the operator. The control signal may be an electrical signal generated in response to the audio signal to control or change the settings of the conveyor.

Throughout this specification, the term 'conveyor' or 'conveyor system' may be used interchangeably and term 'conveyor' may be taken as an example of either a roller conveyor or a belt conveyor.

Referring now specifically to the drawings and the illustrative embodiments depicted therein, FIG. 1 illustrates a schematic block diagram of a voice control interactive system 100 in accordance with an embodiment of the present invention. The voice control interactive system includes multiple computing devices, for example, first computing devices 101a,101b,101n and second computing devices 102a,102b,102n communicably coupled to each other. Likewise, the first computing devices 101a,101b,101n are communicably coupled to multiple conveyors in a warehouse. For ease of explanation, communications between two computing devices from among the multiple computing devices is detailed. Let us assume the two computing devices as a first computing device 101 and a second computing device 102 throughout the description. It is to be expressly understood that communication techniques detailed herein are for the purpose of illustration only, and are not intended as a definition of the limits of the invention. As shown in FIG. 1, the first computing device 101 is communicably coupled to the second computing device 102. The first computing device 101 is communicably coupled to a conveyor. According to an embodiment, the first computing device 101 is communicably coupled to the second computing device 102 via a communication terminal 109. The communication terminal 109 is communicably coupled to the first computing device 101 and the second computing device 102 through either a wired connection or wireless connection. In the embodiment as shown in FIG. 1, the communication terminal is communicably coupled to the first computing device 101 and the second computing device 102 through the wireless connection. The wireless connection, for example, is wireless fidelity (Wi-Fi), Bluetooth, ultra-wideband (UWB) radio. According to an embodiment, the communication terminal may optionally include a conversion engine which converts an audio signal into a digital signal and vice-versa. It is understood to a person skilled in art, any type of conversion engine with suitable components such as, but not limited to, A/D converter, D/A converter, an audio coder/decoder chip or CODEC or other processing circuitry components may be employed. The communication terminal is configured to provide a bi-directional communication of the audio signal and the digital signal to the first computing device 101 and the second computing device 102.

According to an embodiment, the second computing device 102 includes a visual interface 103, a voice interface 108, a processor/conversion engine 104a, 104b, memory 105, and communication module 106. It is to be expressly understood that components of the second computing device 102 detailed herein are for the purpose of illustration only, and are not intended as a definition of the limits of the invention. According to an embodiment, the second computing device 102 may process the audio signal from the voice interface 108 and a text input signal from the visual interface 103 using the processor/the conversion engine 104a, 104b. In some examples, the conversion engine 104b includes speech-to-text (STT) modules and text-to-speech (TTS) modules. In some examples, the processor 104a includes audio processing hardware/software for speech or voice recognition, such as audio filters and correlation applications associated with speech recognition, communications hardware/software, as well as possible RFID capabilities. In some examples, the memory 105 may represent the random-access memory (RAM) devices comprising the main storage of the second computing device 102, as well as any supplemental levels of memory, e.g., cache memories, non-volatile or backup memories (e.g., programmable or flash memories), read-only memories, etc. In addition, the memory 105 may be considered to include memory storage physically located elsewhere in the second computing device 102, e.g., any cache memory in a processor 104, as well as any storage capacity used as a virtual memory, e.g., as stored on a mass storage device or on another computing device or remote server coupled to the second computing device 102 via wireless networks.

According to an embodiment, the audio signals may be processed by the remote server that can run a variety of applications. These applications can relate to the business of maintaining inventory records for a warehouse and can include applications that relate to controlling the communications with the different terminals. These applications are usually integrated with one another to allow voice-controlled operation within the warehouse environment. The application that manages the second computing devices 102a, 102b, 102n maintains information about the identification of each of the second computing device 102 so that data can be directed to a desired second computing device 102 and audio signals received at the remote server can be traced. In a TCP/IP-based network, for example, the remote server would maintain a table of the IP address for each second computing device 102 and use these addresses to identify a sender or recipient of a particular audio signal.

According to an embodiment, the voice interface 108 may transmit the audio signal to the of the second computing device 102 such that the audio signal is processed by suitable components of the conversion engine 104b, for example, STT modules, A/D converter, D/A converter, an audio coder/decoder chip or CODEC or other processing circuitry components. In some example, the voice interface 108 may be coupled to the second computing device 102 through either wirelessly (e.g. Wi-Fi, Bluetooth, etc.) or a cable or wire. According to another embodiment, the second computing device 102 may transmit the audio signal to the remote server. The communication between the remote server and the second computing device 102 may be through a wireless network (e.g. 900 MHz, 2.4 GHz, Bluetooth, etc.), which allows multiple computing devices to share the spectrum.

Figure 2:
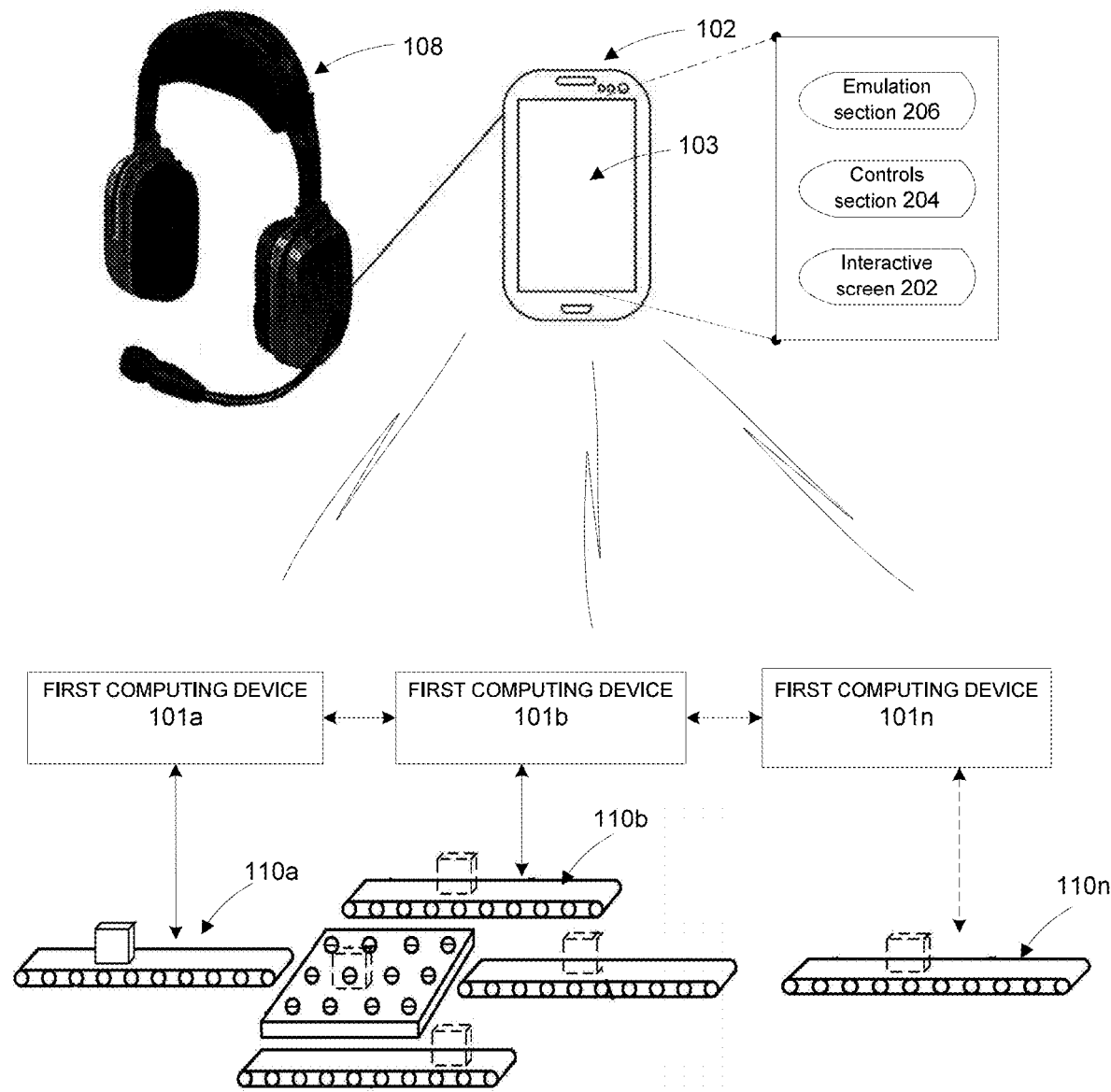
FIG. 2 illustrates an example of a voice interface and a visual interface of the voice control interactive system of FIG. 1 in accordance with an embodiment of the present invention.

The voice interface 108, for example, may be a headset with a microphone as shown in FIG. 2. The headset may be of the type disclosed in U.S. Pat. No. 7,391,863 (Talkman® product available from Vocollect of Pittsburgh, Pa) fully incorporated herein as a reference. The second computing device 102, for example, may be a handheld computing device as shown in FIG. 2. In some example, the second computing device 102 may be a personal digital assistant (PDA), a laptop computer, a desktop computer, a mobile phone, a direct two-way communication device (sometimes referred to as a "walkie-talkie"), etc. The second computing device 102 may be of the type disclosed in U.S. Pub. No. 20050010418 as peripheral device, fully incorporated herein as a reference. According to an embodiment, the second computing device 102 may be a computing device with speech recognition capability sufficient to recognize verbal commands or speech data that can be electronically captured and forwarded as an audio signal or digital signal to the server or to the communication terminal or to the first computing device 101 for further processing. According to an embodiment, the visual interface 103 represents a display of the second computing device 102. The display provides a graphical user interface with multiple sections which will be explained in detail in conjunction with FIGS. 3-10.

According to an embodiment, the first computing device 101 includes a processor 112, a memory 113, a conversion engine 114, and a communication module 111. It is to be expressly understood that components of the first computing device 101 detailed herein are for the purpose of illustration only, and are not intended as a definition of the limits of the invention. In some examples, the conversion engine 114 includes speech-to-text (STT) modules and text-to-speech (TTS) modules. In some examples, the processor 112 includes audio processing hardware/software for speech or voice recognition, such as audio filters and correlation applications associated with speech recognition. It is understood to a person skilled in art, any type of conversion engine with suitable components such as, but not limited to, A/D converter, D/A converter, an audio coder/decoder chip or CODEC or other processing circuitry components may be employed. In some examples, the conversion engine 114 may convert an audio signal to a digital signal or vice-versa. According to an embodiment, the first computing device 101 is connected to the conveyor 110 using wired or wireless connections. The conveyor 110 includes sensors 116 and actuators 118 used as input/output devices of the conveyor 110. According to an embodiment, the first computing device 101 receives input signals from the sensors 116 and transmits output signals to the actuators 118. The first computing device 101, for example, is a conveyor controller configured to operate the conveyor 110. According to an embodiment, the first computing device 101 controls the conveyor 110 using the audio signals received from the voice interface 108 of the second computing device 102. The control of the conveyor 110 using the audio signals will be explained in detailed in conjunction with the components illustrated in FIG. 1 and FIG. 2. It is to be expressly understood that communication and control techniques detailed herein are for the purpose of illustration only, and are not intended as a definition of the limits of the invention. According to an embodiment, one or more of the components or functions in the first computing device 101 and the second computing device 102 may be integrated into a single module, unit, component, or software. For example, the conversion engine 114 may be combined with the processor 112. The communication terminal 109 may be combined with the communication module 111, such that the audio signal, text input signal or the digital signal may be communicated over a wired or wireless network.

According to an embodiment, the audio signal is generated by the voice interface 108 of the second computing device 102. The audio signal includes information relating to the verbal commands or the speech data spoken by an operator associated with the second computing device 102. The verbal commands are spoken through the voice interface 108, for example, the headset. The verbal commands are processed by the second computing device 102 and transmitted in the form of the audio signal to the first computing device 101 through the communication terminal. In some examples, the verbal commands are encrypted or encoded into the audio signal by the processor 104 of the second computing device 102 and transmitted to the communication terminal 109 through the communication module 106 of the second computing device 102. In some examples, when the communication terminal 109 is not included as a part of the voice control interactive system, the second computing device 102 can directly communicate the audio signal to the first computing device 101 over wired or wireless networks bypassing the communication terminal 109. In such scenarios, functions or components of the communication terminal 109 may be provided in the communication modules 106, 111 of both the first computing device 101 and the second computing device 102. According to an embodiment, the audio signal may be processed by the conversion engines 104b, 114 including the STT module, TSS module, the speech recognition module, and other suitable components as discussed previously. For example, when the audio signal is received by the STT module, the verbal commands in the audio signal may be decoded and converted into a text output to be displayed in the visual interface 103. According to an embodiment, the audio signal processed and decoded by the conversion engine is further processed by the processor 104 to provide an appropriate response signal in response to the decoded audio signal. In other words, the response signal comprises information relating to a response for the verbal command spoken by the operator. For example, when the audio signal is decoded into a text output, the processor 104 analyzes the text output and retrieves a corresponding speech response from the memory 105, 113 in response to the text output. According to an embodiment, the audio signal processed and decoded by the conversion engines 104b, 114 is further processed by the processor 104, 112 to provide an appropriate control signal in response to the decoded audio signal. The control signal may be transmitted to the first computing device 101 which operates the conveyor 110 as per the control signal. For example, the control signal 110 is transmitted to control the components of the conveyor 110, for example, the sensors 116 and the actuators 118 of the conveyor 110.

According to an embodiment, the audio signal generated at the second computing device 102 through the voice interface 108 is transmitted to the first computing device 101 for further processing. For example, the audio signal may be processed by the conversion engine 104b of the first computing device 101 including the STT module, TSS module, the speech recognition module, and other suitable components as discussed previously. For example, when the audio signal is received by the STT module, the verbal commands in the audio signal may be decoded and converted into a text output which is then subjected to further processing by the processor 104 to generate the control signal to control the components of the conveyor 110, for example, the sensors 116 and the actuators 118 of the conveyor 110. According to an embodiment, the first computing device 101 using the processor 112 and the memory 113 can generate an appropriate response signal to be transmitted to the second computing device 102. For example, the processor 112 analyzes the decoded audio signal and retrieves a corresponding speech response from the memory 113 in response to the audio signal. In this regard, the processor 104a and the conversion engine 104b of the second computing device 102 may receive and process the response signal from the first computing device 101 using the STT module and the TTS module to project the response signal as a speech output to the voice interface 108 or as a visual output (i.e., the text output) to the visual interface 103 indicating the information relating to the response for the verbal command to the operator. According to an embodiment, the audio signal generated at the second computing device 102 through the voice interface 108 is transmitted to the first computing device 101 and simultaneously processed by the second computing device 102. For example, the audio signal is processed and decoded by both the first computing device 101 and the second computing device 102 to identify the verbal commands in the audio signal. In this regard, the processor 112 of the first computing device 101 may be configured to generate response signals or control signals for a predefined first set of verbal commands and the processor 112 of the first computing device 101 may be configured to generate response signals only for a predefined second set of verbal commands. The first set of verbal commands being different from the second set of verbal commands. For example, the first computing device 101 may generate the response signal or the control signal after decoding the audio signal and identifying the first set of verbal commands, likewise, the second computing device 102 may generate the response signal after decoding the audio signal and identifying the second set of verbal commands.

As discussed in above embodiments, both the first computing device 101 and the second computing device 102 comprises identical components as shown in FIG. 1 to process, encode/decode, transmit/receive the audio signals such that both the first computing device 101 and the second computing device 102 are configured to generate the response signal and the control signal in response to the audio signal. Other hardware components may be incorporated into the interactive voice control system, as may other software applications. In general, routines executed to implement the embodiments of the invention, whether implemented as part of an operating system or a specific application, component, program, object, module or sequence of instructions, or even a subset thereof, will be referred to herein as "computer program code", or simply "program code." Program code typically comprises one or more instructions that are resident at various times in various memory and storage devices in a computing device, and that, when read and executed by one or more processors in the computing device, cause that computer to perform the steps necessary to execute steps or elements embodying the various aspects of the invention. Moreover, while the invention has and hereinafter will be described in the context of fully functioning of the computing devices, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

As shown in the example embodiment of FIG. 2, the voice interface 108 of the second computing device 102 is a headset and the visual interface 103 of the second computing device 102 is a display with graphical user interface. As shown in FIG. 2, the headset may be connected to the second computing device 102 using a wired cable. The second computing device 102 may be connected to the first computing device 101 using a wireless network and the first computing device 101 may be connected to the conveyor 110 using a wired connection. As previously discussed in conjunction with FIG. 1, it is feasible to use any type of arrangements in which the components of the interactive vice control system may be connected using wired or wireless networks. According to an embodiment, the visual interface 103 includes multiple sections, such as an emulation section 206, a control section 204 and an interactive screen 202.

According to an embodiment, the emulation section 206 includes an emulator model of a conveyor arrangement. Generally, the emulator model utilizes a calculation routine that emulates programmable logic controller code used by a programmable logic controller provided as a component of the machine to control various actuators of the machine. As used herein, the phrase "programmable logic controller" encompasses traditional programmable logic controllers as well as microcontrollers, application specific integrated circuits (ASIC), and the like, that may be utilized in embedded systems. Further, the phrase "programmable logic controller code" as used herein means program code that is executed by a programmable logic controller, microcontroller, ASIC, or the like. The graphical representation model may allow an operator to enter conveyor parameters into the graphical user interface and the emulator model will produce output response data corresponding with the parameters entered by the operator. As used herein, the phrase "graphical user interface" means any type of interface using a screen or monitor that presents information to a user and allows a user to input information. Graphical user interfaces may include, but are not limited to, traditional graphical user interfaces (such as interactive windows), tables, and command line interfaces. FIGS. 4-9 provides a screenshot of an animation of a conveyor arrangement provided by the emulation model according to an embodiment. In some examples, the graphical user interface of the emulator is substantially similar to the graphical user interface of the actual human-machine interface used to program and control the conveyor 110. The graphical user interface displays an animation of an operation of the conveyor 110 in response to the verbal commands issued by the operator. In some examples, the operator may interact with the graphical user interface displayed in the emulation section 206 to operate the conveyor 110 and then output programmable logic controller values directly into the programmable logic controller. The programmable logic controller may then send output signals to the various components of the conveyor. Communication between the emulator and the programmable logic controller may be effectuated by a variety of means. For example, a commercially available object linking and embedding for process control (OPC) software package or dynamic data exchange (DDE) software package may be used to enable communication between the emulator and the programmable logic controller. According to an embodiment, the controls section 204 is a part of the emulation section 206 emulating the control buttons and indicators provided in the front of a standard control panel. In some examples, the control panel can house all the electrical control equipment, breakers, relays, contacts, controllers and like components. The components such as the motors, sensors, etc. may be wired back to the control panel. FIGS. 4-9 provides a screenshot of an animation of the buttons in the control panel provided by the emulation model according to an embodiment. Such buttons may be provided in the graphical user interface to start/stop the conveyor 110 and to provide alerts to the operator on the status of the conveyor 110.

According to an embodiment, the interactive screen 202 includes voice dialog between the operator and the second computing 102 and the first computing device 101. The voice dialog may be an interactive dialog provided in the form of text output at the interactive screen 202 and as a speech output in the headset of the operator. According to an embodiment, the information displayed as the text output and the speech output includes information relating to the conveyor 110 and the components 116, 118 comprise status information, location information, configuration settings, measurements recorded in the data store of the first computing device 101, commissioning information or acknowledgement information. As discussed previously, such information is encoded in the form of the response signal. Further, such information may be generated at the interactive screen 202 in the form of queries or in the form of a list of options. Such interactive screen 202 is generated in response to decoding the verbal commands in the audio signal spoken by the operator through the voice interface 108. In some examples, the interactive screen 202 in the form of queries and the list of options may be retrieved from the data store and presented to the operator in the interactive screen 202. Such interactive screen 202 and corresponding verbal command to trigger the interactive screen 202 along with synthesized speech output may be stored in the data store. In some examples, when the audio signal is decoded by the second computing device 102, the verbal commands are analyzed and an interactive screen 202 corresponding to the verbal commands are displayed at the visual interface 103 to be viewed by the operator. At that instant, the synthesized speech output may also be transmitted to the headset such that options or queries in the interactive screen 202 may be read out to the operator. FIGS. 4-9 provides a screen shot of the interactive screen 202 displayed at the visual interface 103 along with the emulation section 206 and the control section 204 according to an embodiment.

As shown in FIG. 2, the second computing device 102 is communicably coupled to one or more first computing devices 101 via a wireless network and each the first computing device 101 may be communicably coupled to the components 116, 118 of the conveyors 110 controlled by the first computing device 101 via a wired network. As shown in FIG. 2, the second computing device 102 is smartphone connected to a headset embedded with multimodal software application as disclosed in US. Pub. No. 20050010418 incorporated herein for reference. Likewise, the first computing device 101 is a conveyor controller which is in connection with the components 116, 118 and includes embedded software to control multiple parameters of the conveyor 110, such controllers are disclosed in U.S. Pat. Nos. 9,738,455, 9,795,995, 9,199,802 incorporated herein for reference. As shown in FIG. 2, such conveyor controller may be a dedicated controller for each conveyor zone or may be a master controller connected to slave controllers of each conveyor zone. In some examples, the master controller may include information of all the slave controllers (i.e.) the information of all the conveyor zones. In some examples, as shown in FIG. 2, the conveyor controllers are interconnected to each other through wired or wireless connection to transmit and receive information. In such scenarios, one the controllers may serve as the master controller with other controllers as slave controllers. As discussed previously, the emulation section 206 and the control section 204 may display the conveyor zones which the operator intends to control. The operator may select one of the conveyor zone using the interactive screen 202 and the conveyor zone is displayed in the emulation section 206 with the control buttons and indicators displayed in the control section 204. In this regard, the smartphone (i.e., the second computing device) is configured to request or retrieve information from any master controller or the slave controller (i.e., the first computing device) according to the verbal command spoken by the operator. In some examples, the interactive screen 202 for each of the master controller or the slave controller operating the conveyor zones may be stored in the data store and may be retrieved based on the verbal commands to be presented to the operator. As discussed previously, the interactive screen 202 may provide a list of option or queries or both to the operator such that the operator can select or respond based on the list of option or queries generated based on the verbal command According to an embodiment, if the verbal command spoken by the operator in response to the list of option or queries does not match with any predefined verbal command in the data store to further provide an interactive screen 202, such verbal command may be directed to the master controller or slave controller for processing. Such verbal commands may be control commands issued to either the master controller or slave controller to start/stop the conveyor zone or change the operating parameters of the conveyor zone. According to another embodiment, the second computing device 102 may decode the audio signal to identify a first set of verbal commands and a second set of verbal commands. The first set of verbal commands can include spoken words to control the conveyor zone. Such first set of verbal commands are recognized by the second computing device and directed to the controller of the conveyor zone mentioned in the spoken words. The second set of verbal commands can include spoken words to select an option from the list of options displayed at the interactive screen 202. Such spoken words may trigger another list of options in response to the spoken words. In other words, multiple interactive screens 202 may be interlinked to each other and retrieved from the data store based on the spoken words in the second set of verbal commands. An example of such interlinked interactive screens 202 retrieved and presented to the operator at the visual interface 103 in response to the verbal commands is shown in FIG. 3.

Figure 3:
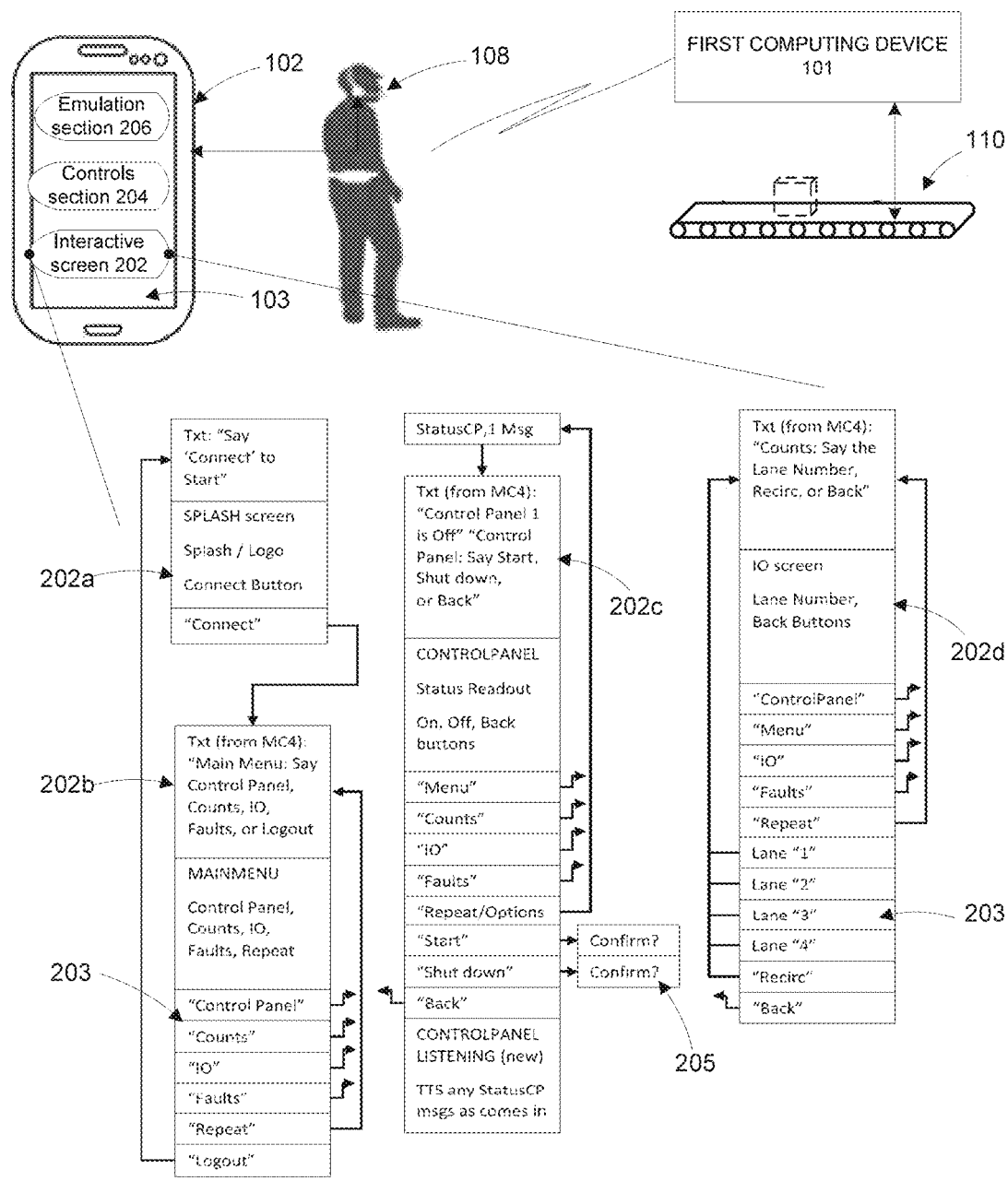
FIG. 3 illustrates an example of an interactive screen on the visual interface in accordance with an embodiment of the present invention.

FIG. 3 illustrates an example of the interactive screen 202 on the visual interface 103 in accordance with an embodiment of the present invention. As shown in FIG. 3, the interactive screen 202 displays an interactive voice dialog between the second computing device 102 and the first computing device 101. The verbal command from the operator is received through the microphone, the speech output is provided through the headphones and the text output is provided in the interactive screen 202. An example of the interlinked interactive screen 202 is shown in FIG. 3. Such interactive screens 202 are retrieved based on the verbal commands spoken by the operator. FIG. 3 shows an example of four interactive screens 202 with one main screen and three interlinked interactive screens 202 retrieved from the data store in response to a spoken word by the operator. As discussed previously, the interactive screen 202 are displayed with list of options 203 or queries 205 or both. The four interactive screens 202 shown in the example of FIG. 3 includes a combination of list of options 203 and queries 205. As shown in FIG. 3, the main screen is a startup screen displayed at the visual interface 103 in response to operator logging into the software application installed on the second computing device 102. The software application, for example, may be a Vocollect™ voice MP speech recognition software or proprietary control software for the conveyor such as Honeywell Momentum Machine Control (MC4) software. According to an embodiment, the operator can login into the software application using verbal commands in the form of spoken words or a string of spoken words through the headset of the second computing device 102. For example, the operator may utter a verbal command "Login Jason" or may utter the string of spoken words "Hello Computer, this is Jason". In response to the verbal command, the second computing device 102 may output a predefined response retrieved from the data store associated with the spoken verbal command or sentence. For example, the response may be "Voice recognized, Welcome Jason". Such response may be outputted in the form of the text output or the speech output. In some examples, the text output may be displayed in the form of an interactive screen 202 displaying a welcome message. In some examples, the speech output may be outputted at the headphones of the operator with an audio of the welcome message without displaying the text output.

Embodiments described in conjunction with FIG. 3 may be examples of a communication between the two software applications, for example, the Vocollect and the MC4 installed in the second computing device 102 and the first computing device 101 respectively. The term conveyor controller or the master controller or the slave controller or the first computing device may be used interchangeably to refer to a device that is installed with the MC4 software. The term "second computing device", "smartphone" may be used interchangeably to refer to a device that is installed with the Vocollect software. It is also feasible to provide both the software applications in a single device, either the first computing device 101 or the second computing device 102.

Turning now to FIG. 3, the main screen is displayed after logging into the software application is complete using voice/speech recognition at the second computing device 102. The main screen displays a text message prompting the operator to utter a verbal command to connect with the first computing device 101. As discussed previously, a connection between the smartphone and the master controller or the slave controller controlling the conveyors may be established once the operator utters the verbal command prompted at the visual interface 103 in the form of the main screen. For example, the main screen displays the text message "Say 'Connect' to Start". In response, the operator may utter the verbal command 'Connect' to establish a connection with the master controller or the slave controller controlling the conveyors. As discussed previously, in response to the verbal command 'Connect'—first interlinked interactive screen 202b is displayed at the visual interface 103 to the operator. The first interlinked interactive screen 202b may be retrieved from the data store of the second computing device 102 or of the first computing device 101. As discussed previously in conjunction with FIG. 1, the first computing device 101 may also be configured to include the capabilities such as, but not limited to, voice recognition, speech synthesizing, text-to-speech, speech-to-text, A/D or D/A converters etc. Therefore, the first computing device 101 with the software application is configured to retrieve the first interlinked interactive screen 202b from the data store and transmit it to the second computing device 102 to be displayed at the visual interface 103. As shown in FIG. 3, the first computing device 101 responds with the first interlinked interactive screen 202b which displays a list of options 203 to the operator. The list of options 203 is 'Main Menu', 'Control Panel', 'Counts', 10', 'Faults', 'Repeat', and 'Logout'. The operator can select an option from the list of options 203 by uttering a spoken word through the headset. For example, if the operator utters the spoken word 'Control Panel' which is one option in the list of options 203, then the spoken word will trigger a second interlinked interactive screen 202c associated with the spoken word 'Control Panel'. As previously discussed, the second interlinked interactive screen 202c is retrieved from the data store and displayed at the visual interface 103 with another list of options 203 that the operator can select by uttering the spoken word through the headset. Likewise, if the operator utters the spoken word 'Counts' which is one option in the list of options 203, then the spoken word will trigger a third interlinked interactive screen 202d associated with the spoken word 'Counts' with yet another list of options 203. As discussed previously, in some examples, the interactive screen 202 may display a query 205 in along with the list of options 203 such that the operator may respond to the query 205. For example, as shown in FIG. 3, when the first interlinked interactive screen 202b is displayed with the list of options 203, a message indicating the status of the Control Panel is also displayed "Control Panel is Off". In response to reading the message through the display or hearing the message through the headphones, the operator can utter the verbal command 'Start' if he intends to start the control panel. In response to the verbal command, a query 205 is generated on the interactive screen 202 asking for a confirmation from the operator. The query 205 may be "Confirm 'Start' Control Panel?" and in response the operator may again utter the verbal command 'Start' confirming the start of the Control Panel.

As discussed previously, the first set of verbal commands can include the spoken words to control the conveyor zone. Such first set of verbal commands, for example, may be the 'Start' or the 'Connect' command discussed herein which are recognized by the second computing device 102 and directed to the controller of the conveyor zone such that the conveyor controller turns on the control panel in response to the spoken word 'Start'. For example, a speech recognition software generates unique instructions for each of the first set of verbal commands. The unique instructions are sent to the conveyor controller. The conveyor controller uses the instructions to generate control signals that are delivered to the components on the conveyor. In some examples, the speech recognition may occur at either the first computing device 101 or the second computing device 102.

According to an embodiment, the interactive screens 202a, 202b, 202c, 202d as described in conjunction with FIG. 3 may be generated dynamically without use of a predefined template for the interactive screens 202a, 202b, 202c, 202d. As shown in FIG. 3, all the interactive screens 202a, 202b, 202c, 202d exist in the predefined template and stored in the data store. In certain scenarios, if the operator would wish to create a customized template for the interactive screens 202a, 202b, 202c, 202d, then such customized template can be created dynamically by the operator by the voice dialogs as described previously. For example, if the operator is troubleshooting a conveyor zone in real time, then the operator wishes to create a customized template for that conveyor zone for monitoring specific parameters, then he may utter a string of words expressing those specific parameters through the headset such as "1. Watch Divert Count, 2. Photo Eyes, 3. Jam Status and Motor Status of Lane 3 and Lane 4". The voice application software may then dynamically create an interactive screen 202 with the string of words listed as options in the interactive screen 202. Such interactive screen 202 may be stored as the customized template for that conveyor zone. Further, the operator may select option 2 and utter the spoken word 'Photo Eyes'. As discussed previously in response to the spoken word a query 205 is generated on the interactive screen 202 asking "Which Photo Eye would you like to monitor?". In response to the query 205, the operator may respond by uttering the spoken word 'Photo Eye-1'. Such spoken words may be decoded using speech recognition software at the conveyor controller and corresponding status of the Photo Eye-1, for example, ON or OFF, may be transmitted to the second computing device 102 and outputted as the speech output through the headset of the operator.

As discussed previously, when the operator is troubleshooting the conveyor zone, the operator may login through the second computing device 102 and establish the connection with the first computing device 101. As discussed previously, once the login is complete, the main screen 202a may appear, and in addition, the operator may be notified with some messages read through the headset or the displayed in the display. For example, the message may be "Your Maintenance Supervisor left you with 3 tasks. Would you like me to direct you to the location of the first one?". According to another embodiment, when the operator would like to order a few damaged or missing components of the conveyor 110 while troubleshooting, he may utter a string of words, which may be transmitted to another computing device or a server, for example, a warehouse management system. For example, the string of words may be "Vocollect Talkman A720, would you tell Department 101 to order another two extra 24 v DC power supplies?". The Voice software application will recognize certain words from the string of words such as the device name, the department, the part name or number and transmit it to the warehouse management system which will then be checked by inventory department.

According to an embodiment, the interactive voice dialog between second computing device 102 and the first computing device 101 installed with the voice software application and the proprietary control software application is aware of the location of the operator handling the second computing device 102. In some examples, the location and position may be calculated using techniques generally known in the art, for example, cellular networks, short-range wireless networks, Global Positioning System (GPS) and the like. In some examples, the second computing device 102 may include a navigation application uses a GPS Unit of the second computing device 102 to determine the location of the second computing device 102. For example, the GPS Unit receives signals from one or more global positioning satellites, and can use the signals to determine the current location of the mobile devices. In some implementations, rather than the GPS Unit, the mobile device includes a module that determines a location of the mobile device using transmission tower triangulation or another method of location identification. The navigation application can use the current location of the mobile device to identify information associated with geographic locations that are in close proximity to the location of the second computing device 102. In some examples, a location data may be stored in the second computing device 102 as a relative location data relative to a known location of fixed devices, such as a conveyor, in the warehouse. For example, relative location data may be obtained using spatial coordinates or relative coordinates or GPS coordinates or Cartesian coordinates of the fixed devices with respect to a reference location of the second computing device 102. In other embodiments, the location data can be derived from one or more real time location systems (RTLS), such as short range wireless networks and other forms of indoor location determination methods. The relative location data may be updated each time the second computing device 102 is in a new location from the reference location. In some examples, several such reference location may be determined for the second computing device 102 such that an absolute location of the second computing device 102 relative to the fixed devices may be determined. In some examples, a relative location map may be generated for the fixed devices using a localization algorithm as generally known in the art. In some examples, a relative distance between the fixed devices and the second computing device 102 may be calculated using range-based algorithms with lateration or tri-lateration techniques which usually use the coordinate information of the fixed devices to find the relative distance between the fixed devices and the second computing device 102. In an embodiment, the second computing device 102 can employ a proximity safety interlock to stop operation of the conveyor unless the operator is in a predefined location or proximity to the conveyor.

According to an embodiment, the second computing device 102 may be equipped with a route calculator which calculates the optimal route between the second computing device 102 and the fixed devices. The optimal route, for example, may be the shortest route and fastest route considering any obstacles in the pathway to reach the fixed devices. As discussed previously, the relative location map creating using the localization algorithm can be used to calculate the optimal route to the fixed devices. In some examples, the route calculator generates turn-by-turn route instructions. In some examples, the relative distance between the current coordinates of the second computing device 102 and the fixed destination coordinates of the fixed devices is estimated and a series of turn-by-turn instructions is provided to the operator.

According to an embodiment, the optimal route and the turn-by-turn instructions are provided as a speech or audio output through the headset of the operator. For example, the operator may speak a verbal command with a string of words "navigate to conveyor 101" or "navigate to aisle 5". The voice application software may then decode this verbal command and transmit the route calculator which may then perform the optimal route calculation as discussed above and provide the turn-by-turn instructions to the operator via the voice application software such that the operator can navigate based on the audio output received through the headset. The turn-by-turn instruction, for example, may be "turn left", "turn right", "proceed" and "turn around", etc. received as the audio output to reach intended destination.

According to an embodiment, the interactive screen 202 may be reconfigured based on change in location of the second computing device 102 with respect to the first computing device 101 or fixed deices in the warehouse. As discussed previously, the list of options 203 or queries 205 in the interactive screen 202 may vary based on a current location of the second computing device 102. For example, the, the list of options 203 may be reprioritized or additional query 205 may be created for the operator. For example, the voice application software may continuously track the location of the second computing device 102 and the relative distance from the fixed devices using techniques discussed previously to dynamically reconfigure the list of options 203 or queries 205. In some examples, the voice application software may be location aware based on the techniques discussed above and may retrieve an appropriate interactive screen 202 at the visual interface 103 of the second computing device 102. For example, the data store may include interactive screens 202 associated with predefined distances. The voice application software may compute the current location and the relative distance using techniques discussed previously and compare the relative distance with the predefined distances and retrieve the associated interactive screen 202 to be displayed to the operator. For example, the system may reconfigure the list of options 203 or queries 205 if the position of the second computing device 102 changes by some predetermine value (e.g., the position changes by 1 mile to 10 miles relative to the reference location of the second computing device 102 or relative to the fixed location of the fixed devices). Based on a scale of 10 miles, the voice software application may retrieve new location and compute relative distance and reconfigure the interactive screen 202 or retrieve the appropriate interactive screen 202 based on the verbal command from by operator.

As discussed previously in conjunction with interlinked interactive screens 202, when the operator utters the spoken word "Start" in response to the list of options 203 displayed in the interactive screen 202, the first computing device 101 may convert it to the control signal which will start the conveyor zone. However, if the operator utters the spoken word "Start" after moving away from the reference location or after moving a predetermined distance away from the conveyor, then the voice software application will reconfigure the list of options 203 or queries 205 based on the current location and the relative distance the operator has moved with respect to the reference location or the fixed location of the conveyor 110. In some examples, in response to the reconfiguration based on the current location, the interactive screen 202 will display a query 205 "Did you mean "Start" conveyor A123?" Conveyor A123 is 200 feet north of your current location". In some examples, in response to the reconfiguration based on the current location, the interactive screen 202 will display a list of options 203 which includes "1. Reach Conveyor A123 heading north through aisle 5", "2. Reach Conveyor 101 heading south passing Lane 3 and so on. Such list of options 203 may be displayed based on the optimal route calculation displayed in the order of shortest or fastest route first to reach the conveyor A123. In this regard, the voice software application and the control software application may refrain from starting the conveyor until the operator is within the vicinity of the conveyor. In other words, the "Start" command from the operator may not be processed until the operator reaches the reference location defined for processing any control commands from the operator. Therefore, a safe operation of the conveyor may be ensured by considering the current location of the operator and configuring the interactive screen to respond based on the current location.

FIGS. 4-9 illustrates an example of the visual interface in accordance with an embodiment of the present invention. An example of the visual interface showing the emulation section 206, the control section 204 and the interactive screen 202 for controlling a sorter conveyor is shown. According to an embodiment, the list of options displayed on the interactive screen 202 is outputted as a speech output through the headphones of the operator and an option is selected via a verbal command/spoken word/speech input by the operator through the microphone. In this regard, the sorter conveyor is controlled using the voice dialogs between the first computing device 101 (e.g., the sorter controller) and the second computing device (e.g., headset with mic. and handheld device with display).

Figure 4:
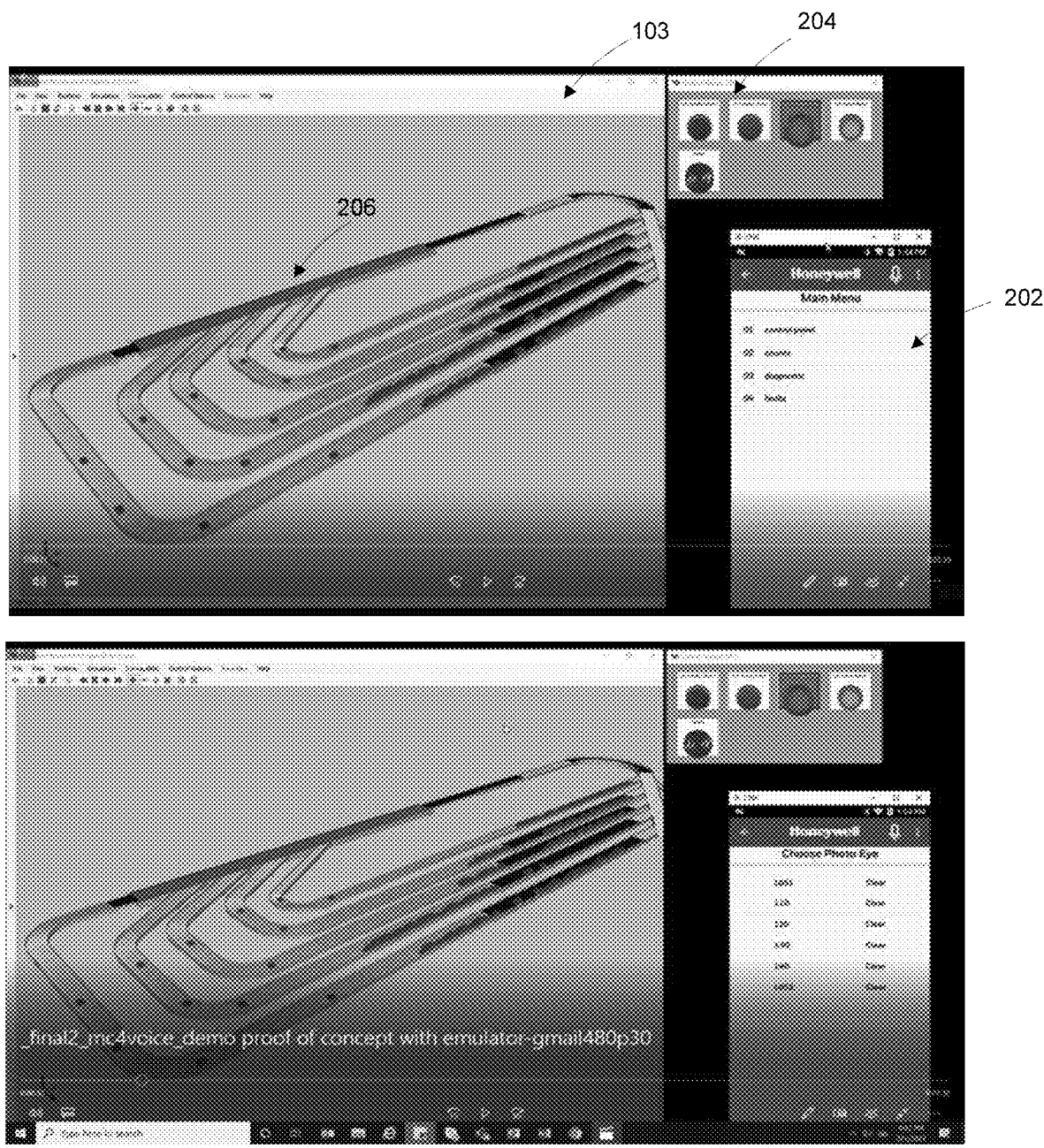
FIGS. 4-9 illustrates an example of the visual interface in accordance with an embodiment of the present invention.

As shown in FIG. 4, the emulation section 206 includes an animation of the sorter conveyor. It is seen that the sorter conveyor includes five divert conveyor lanes in which the packages diverted from the sorter are conveyed. In some examples, the emulation section 206 may include options to zoom-in and zoom-out the sorter conveyor to provide a closer view of different portions of the sorter conveyor. In some examples, the emulation section 206 may dynamically toggle between the zoom-in and the zoom-out to provide a closer view of the components, divert lanes, packages, etc. in response to the verbal commands received during the voice dialog. As shown in FIG. 4, the control section 204 includes the control buttons and indicators provided in the front of a control panel of the sorter conveyor. In the example shown in FIG. 4, starting from the left, green button is the 'start control panel', which is supposed to start the sorter conveyor followed by non-embossed red button is the 'stop control panel', which shuts all the divert conveyor lanes. The embossed red button is the 'Emergency Off', which kills electricity immediately to all equipment, and is usually embossed to grab attention of the operator. The yellow button is an indicator in the form of a pulsing light to notify the operator that the controller is on and running. The final indicator below the first row of control buttons and indicators is a warning horn to provide an alarm if an operator accidentally comes in contact or touches the conveyors that are currently turned off.

Figure 5:
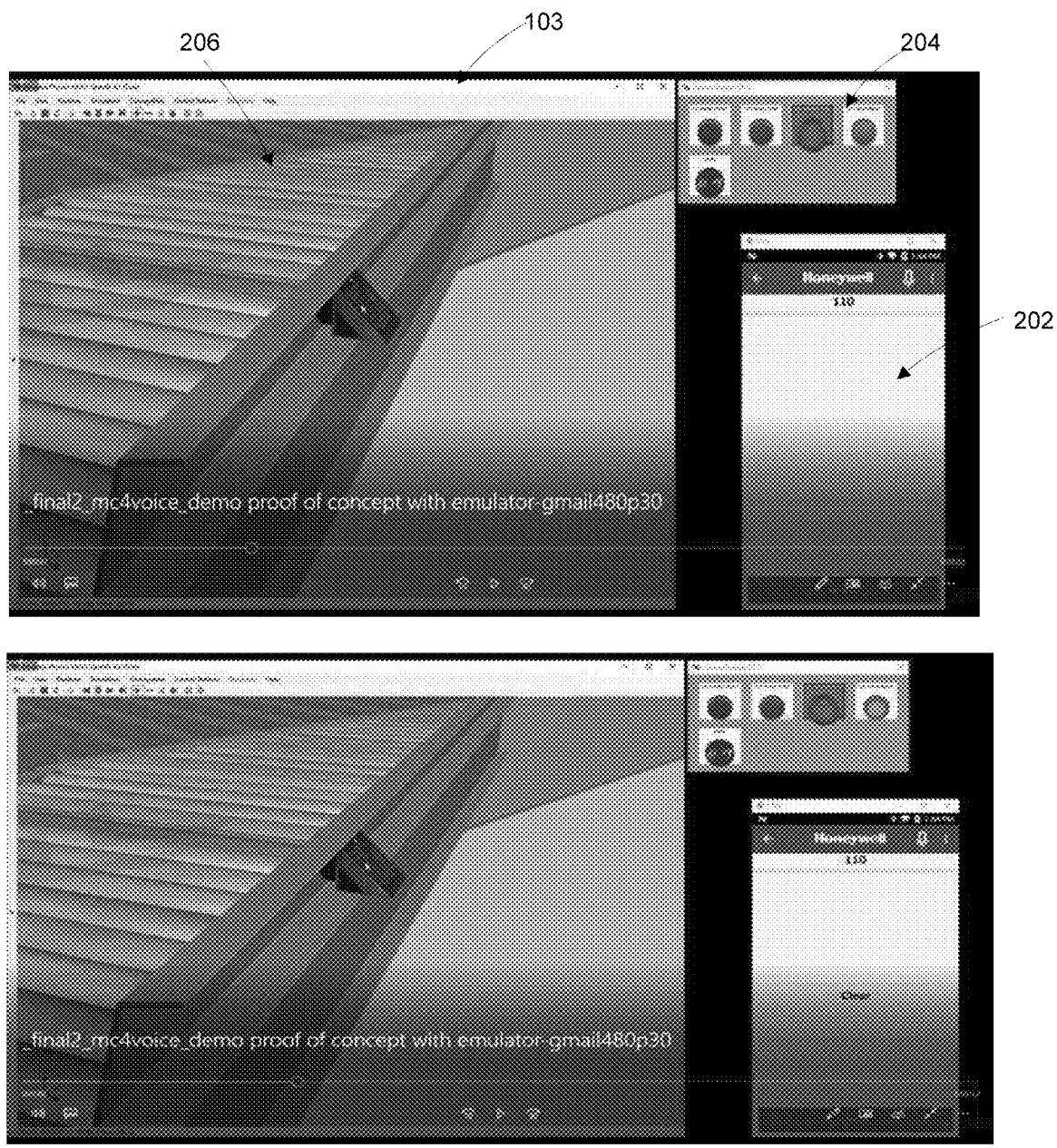

As shown in FIG. 4, the interactive screen 202 in the first screen shot provides the operator with a list of options available in the 'Main Menu'. The operator can select an option by verbally uttering an option among the list of options via the headset worn by the operator. In the example shown in FIG. 4, the operator selects the second option 'Counts'. The operator utters the word 'Counts' which is processed by the second computing device using suitable techniques disclosed in the description and an interlinked interactive screen 202 is displayed at the display replacing the previous interactive screen 202 displaying the 'Main Menu'. The interactive screen 202s may be toggled using the verbal utterance from the operator, for example, the operator may utter the words 'Main Menu' which will then retrieve and toggle back to the previous interactive screen 202 displaying the 'Main Menu' replacing the interlinked interactive screen 202. In the example shown in FIG. 4, when the operator selects the option 'Diagnostic', the interactive screen 202 with a list of all photoeyes associated with the conveyor is displayed along with the status of each photoeye retrieved by the second computing device from the sorter controller. The list includes photoeye serial numbers, for example, '1001', '110', '120', '130' and so on. The operator can utter any number displayed in the list, for example, say '110', then the interactive screen 202 displaying the status of the photoeye 110 will appear which is shown in FIG. 5. According to an embodiment, the list of options displayed as the text output in the display may be simultaneously readout as the speech output to the operator Likewise, the status of the photoeye may be simultaneously displayed and readout at the second computing device.

Figure 6:
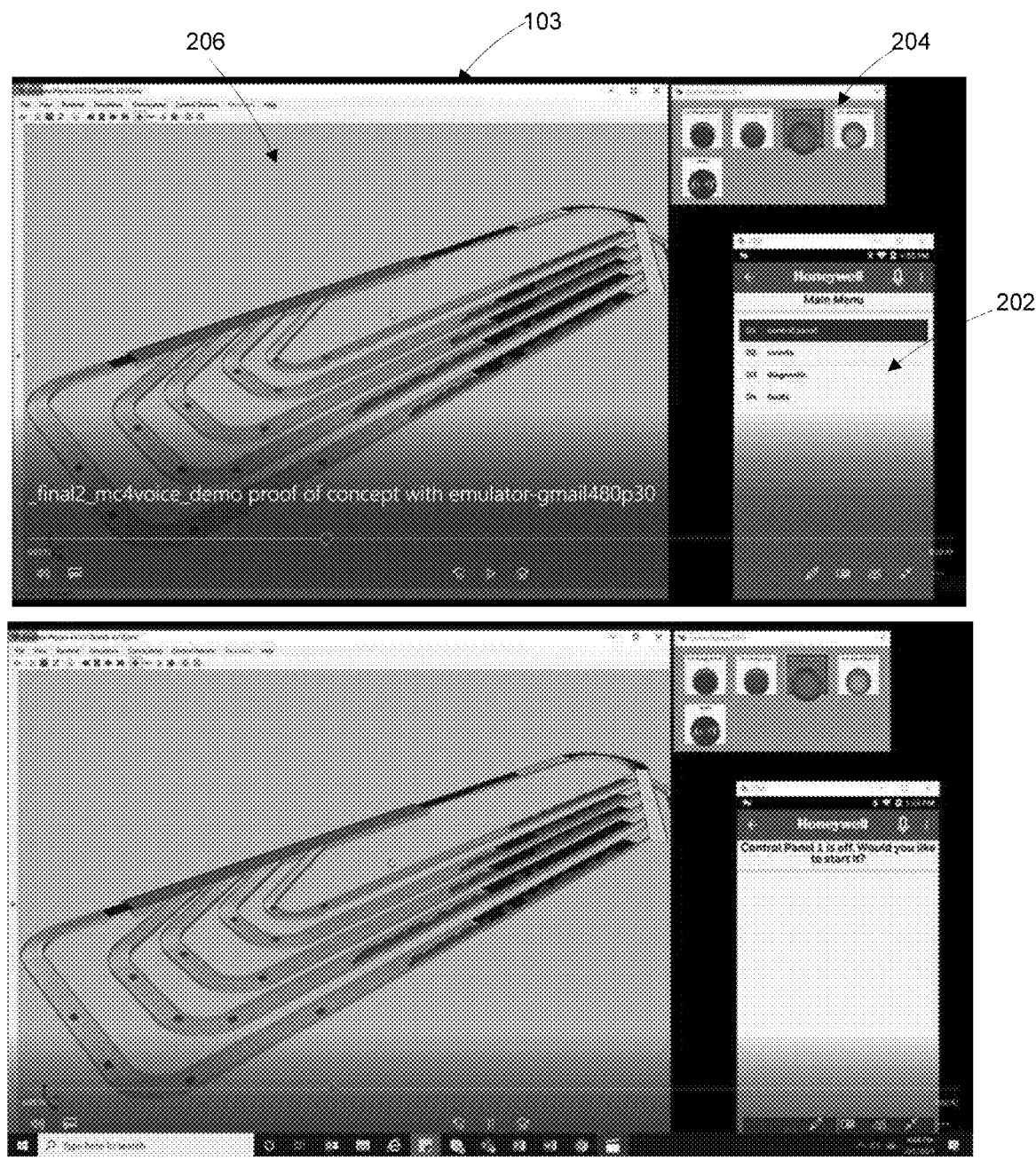
Figure 7:
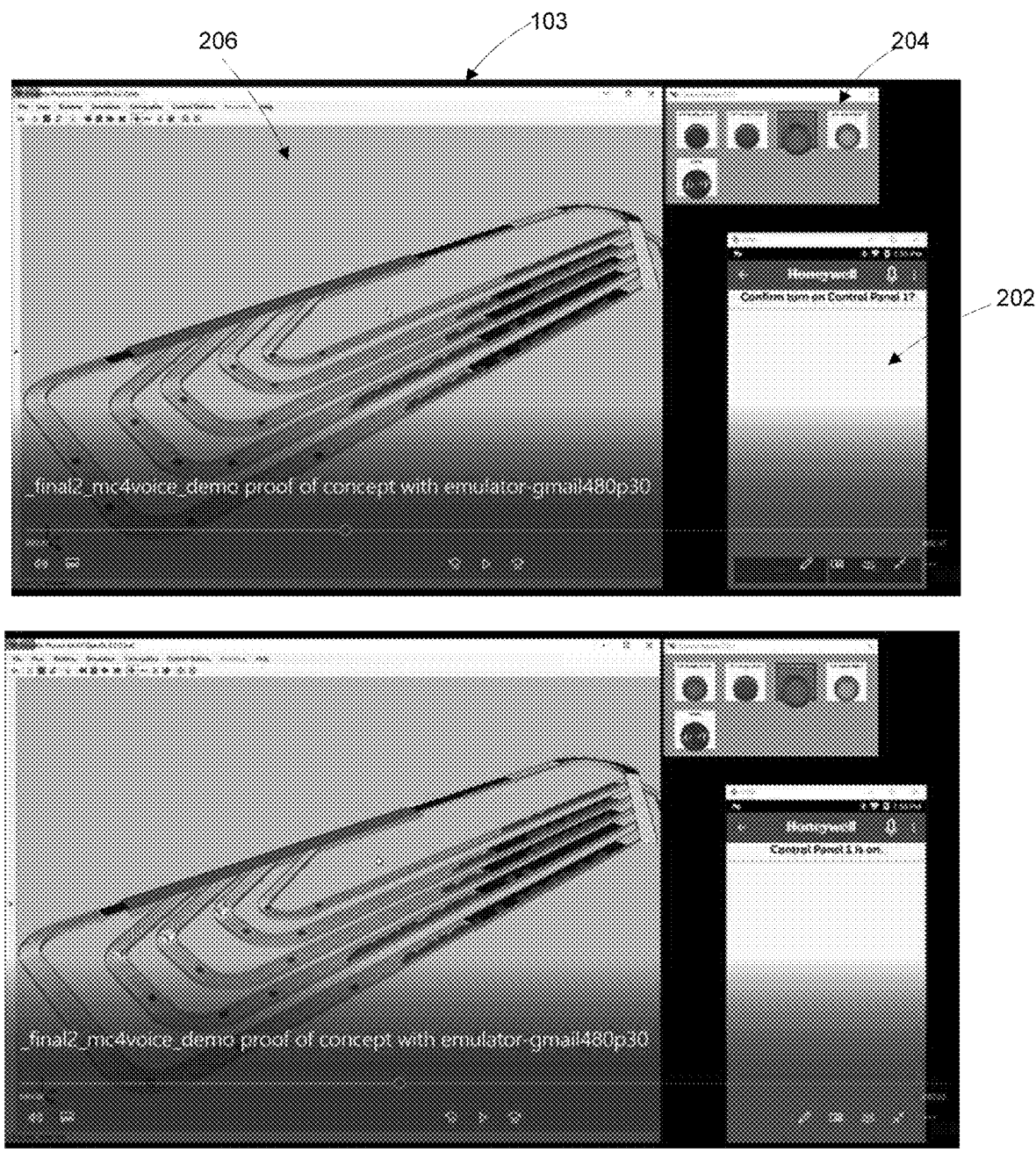

Turning now to FIG. 5, the interactive screen 202 displaying the status of the photoeye 110 is shown. According to an embodiment, when the status of the photoeye is shown in the interactive screen 202, the animation at the emulation section 206 dynamically zoom-in to show the location and status of the actual photoeye installed on the conveyor. As seen in FIG. 5, the status of the photo eye 110 is displayed as 'CLEAR' in the interactive screen 202 and simultaneously the photo eye 110 is shown in the emulation section 206. Turning now to FIG. 6, the first screenshot shows that the operator has toggled back to the previous interactive screen 202 showing the 'Main Menu'. In this example shown in FIG. 6, the operator chooses the option 'Control Panel' and utter the words 'Control Panel'. The spoken words retrieve another interlinked interactive screen 202 with a query and the current status of the Control Panel. In the example, the interlinked interactive screen 202 displays 'Control Panel 1 is off. Would you like to start it?'. The operator may respond may utter the verbal command 'Start' or 'Yes' or 'No' or any other preprogrammed in the voice application software and the proprietary control software. According to an embodiment, the operator may also select or click on the green button in the control section 204 to start the Control Panel in response to the query displayed on the interactive screen 202. When the responds using the verbal command 'Start' or 'Yes' or any other affirmative word to start the control panel, another interlinked interactive screen 202 with a query for confirming the utterance of the operator is displayed. As seen in FIG. 7, the query is 'Confirm turn on Control Panel 1 ?' In response, the operator may utter the verbal command for the second time 'Start' or 'Yes' or any other affirmative word to start the control panel 1. Likewise, the software may be preprogrammed to add an additional confirmation query for every control command issued by the operator.

Figure 8:
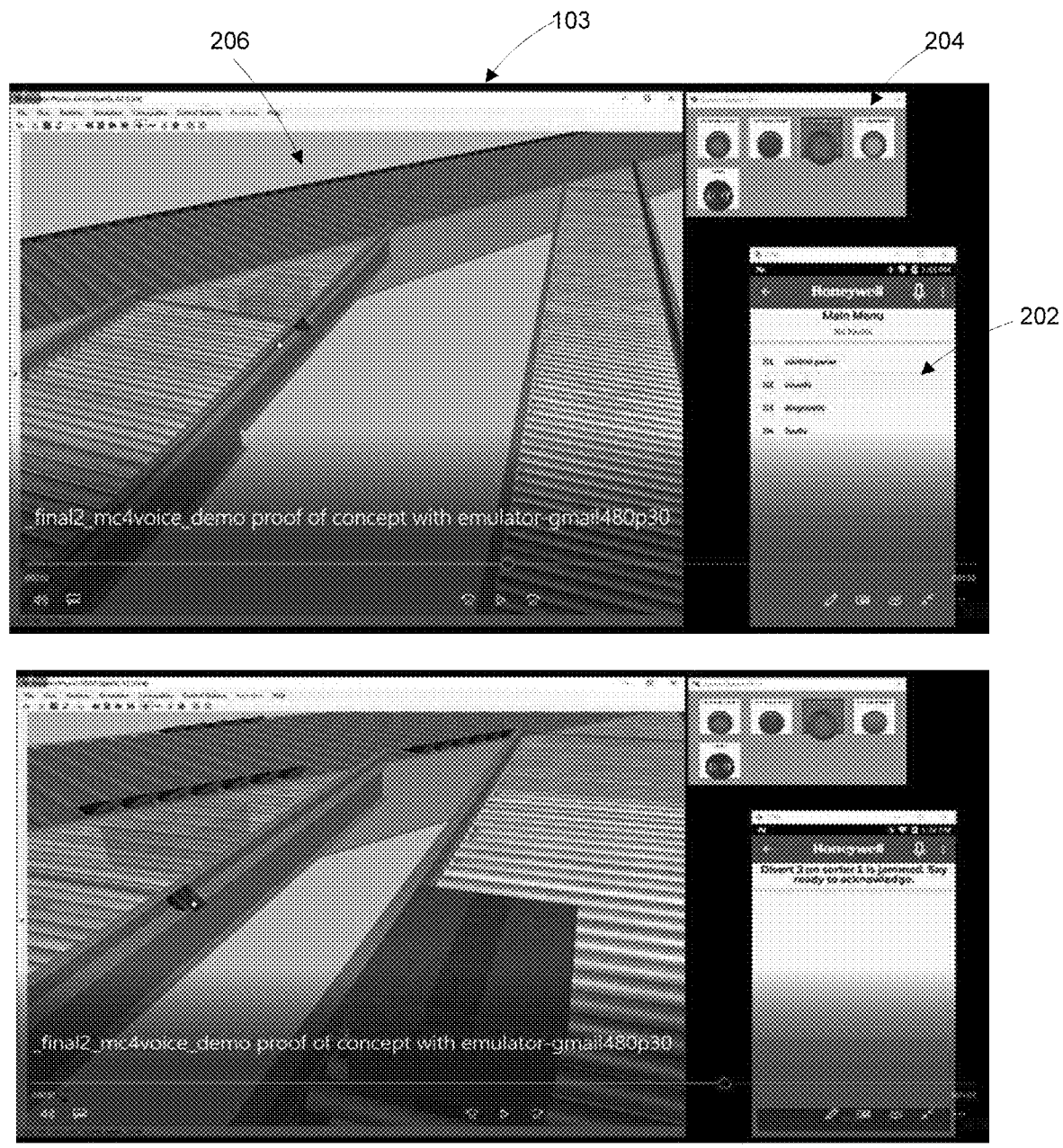

Turning now to FIG. 8, the screenshots show that the operator has toggled back to the main interactive screen 202 by uttering the words 'Main Menu'. According to an embodiment, a status of the conveyor and the list of options may be superimposed and displayed in a single interactive screen 202 without retrieving any interlinked interactive screen 202. An example of such interactive screen 202 is shown in the first screenshot of FIG. 8 in which the status message is displayed along with the list of options in the 'Main Menu' interactive screen 202. For example, the operator may select the last option 'Faults' and the status message 'No faults' appears in the same interactive screen 202. According to another embodiment, the status of the conveyor may be shown in the form of interlinked interactive screen 202. An example of such interactive screen 202 is shown in the second screenshot of FIG. 8 in which the status message of fault at the divert lane 3 is notified to the operator. For example, the operator may select the last option 'Faults' and the status message 'Divert 3 on sorter 1 is jammed. Say ready to acknowledge' appears on a separate interactive screen 202.

Figure 9:
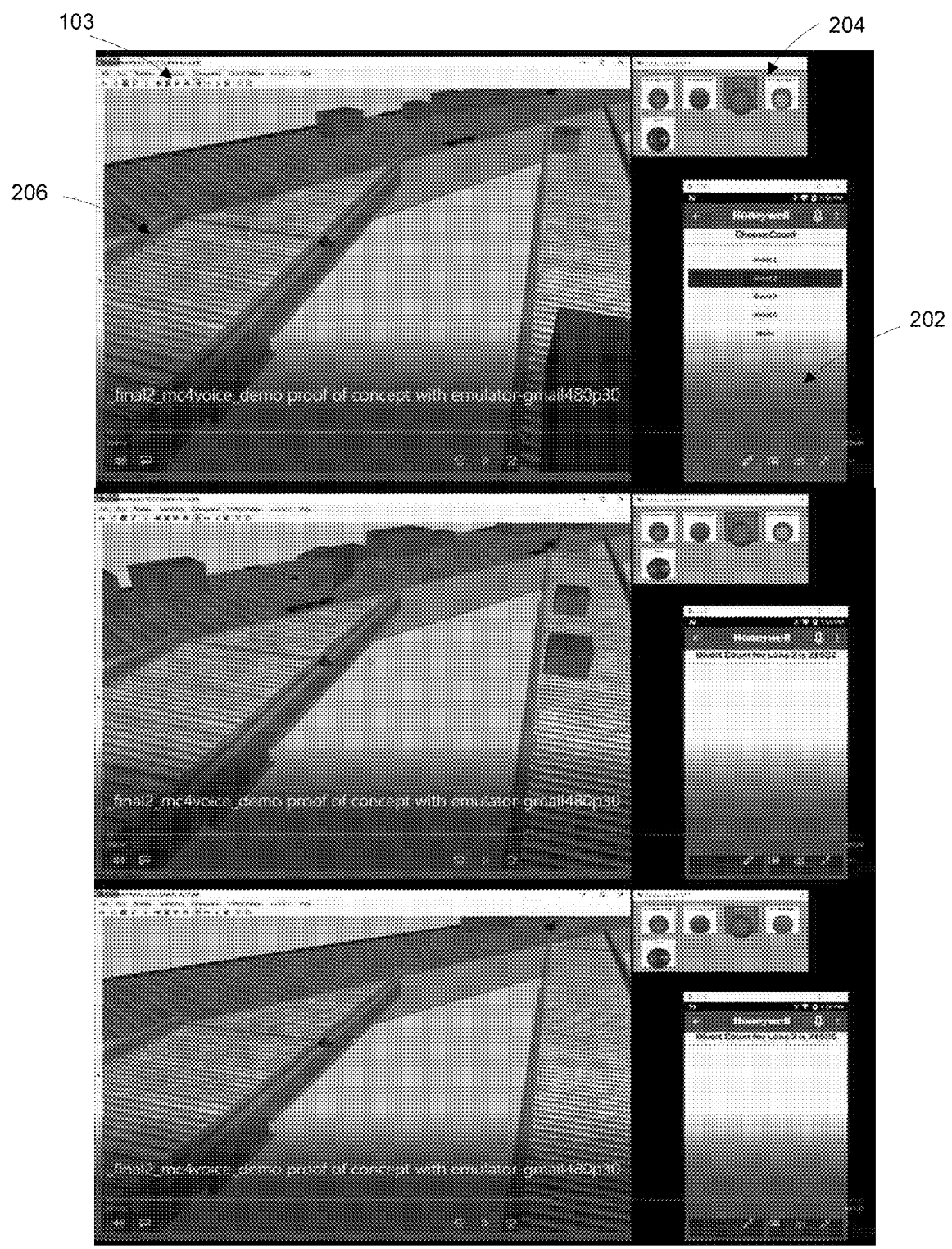

Turning now to the second screen shot of FIG. 9, the operator has utter the word 'Counts', the interlinked interactive screen 202 displaying the list of available divert lanes is shown. The list of available divert lanes 'divert 1', 'divert 2', 'divert 3', 'divert 4', 'recirc' (i.e., the last lane which is a recirculation lane after divert lane 4). The operator may utter the word 'divert 2' and corresponding interlinked interactive screen 202 may appear as shown in FIG. 9. The second screenshot of FIG. 9 shows that the Divert Count for divert lane 2 (i.e.) number of packages conveyed past the photoeye sensor of divert lane 2 at that instant of time. The Divert count is shown as 21502. According to an embodiment, the status received from the controller to the second computing device may be updated regularly at predefined intervals. In the example shown in FIG. 9, the Divert count is updated from 21502 to 21505 after two packages have been conveyed past the photoeye sensor.

Figure 10:
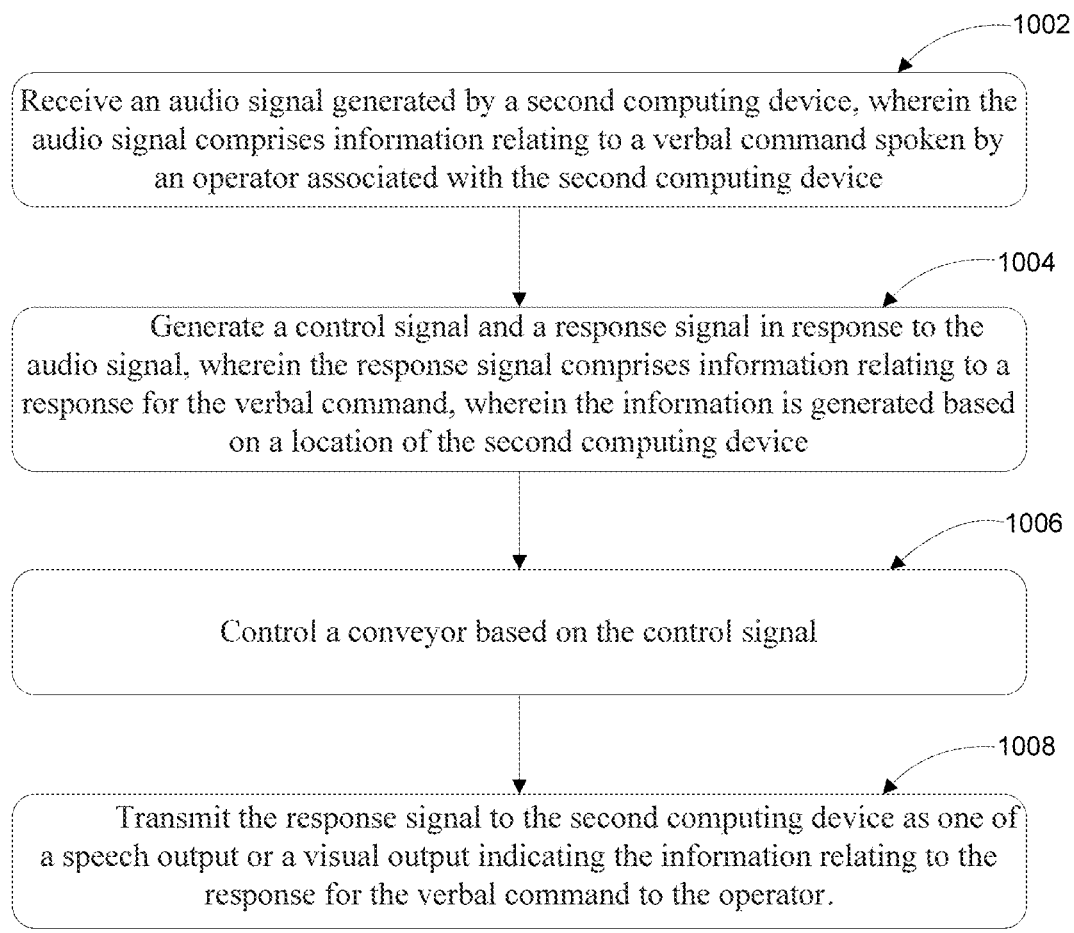
FIGS. 10 and 11 illustrates a flowchart for monitoring and controlling a conveyor using the voice control interactive system in accordance with an embodiment of the present invention.
Figure 11:
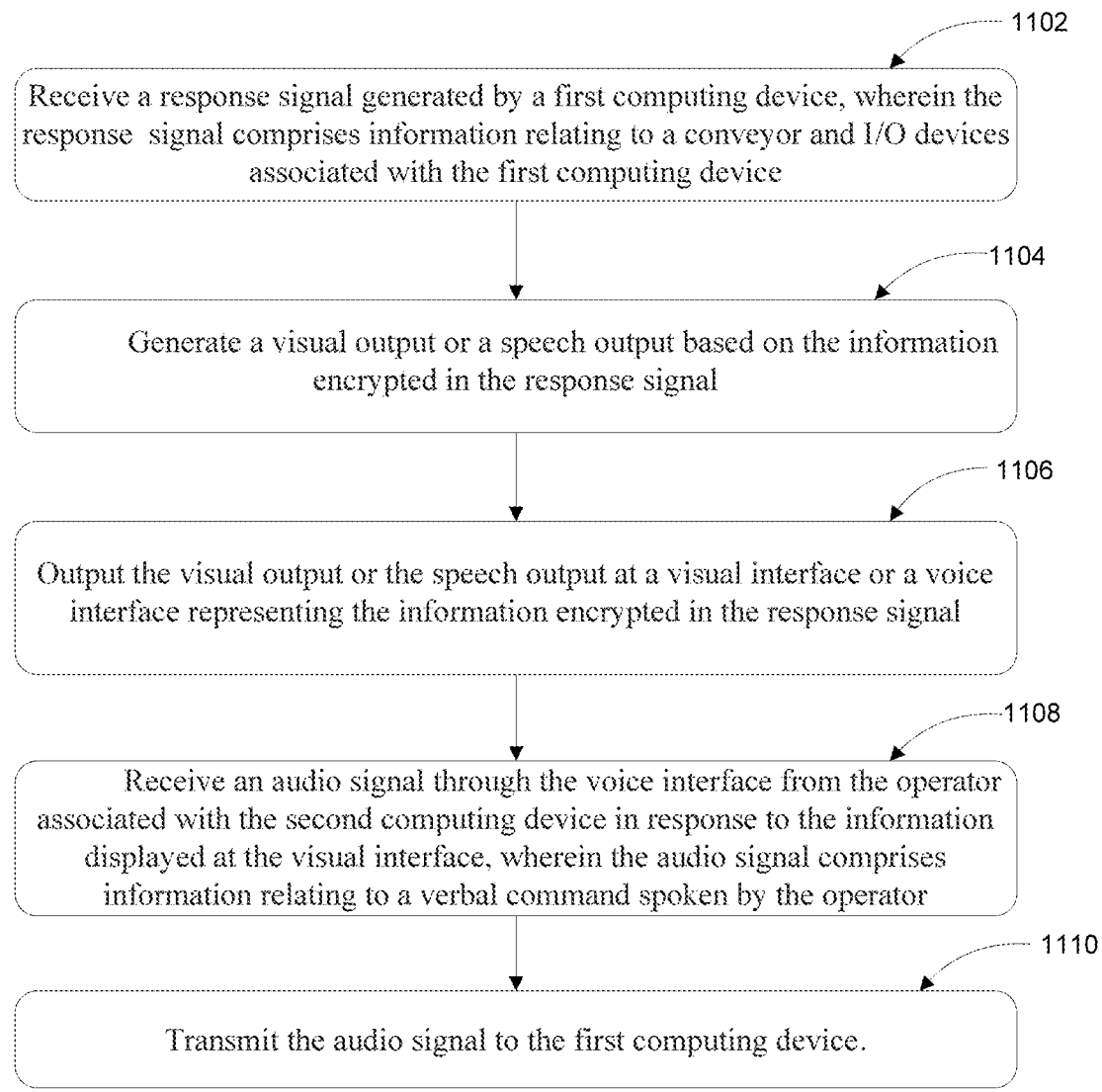

FIGS. 10 and 11 illustrates a flowchart for monitoring and controlling a conveyor using the voice control interactive system in accordance with an embodiment of the present invention. The voice interactive system as disclosed in FIG. 1 includes a communication between various computing devices within the facility. An example communication between the first computing device and the second computing device is discussed herein in conjunction with FIG. 5. At step 1002, the first computing device receives an audio signal generated by the second computing device. The audio signal includes information relating to a verbal command spoken by an operator associated with the second computing device. As discussed previously, the verbal commands are spoken by the operator through the headset worn by the operator associated with the second computing device. At step 1004, the first computing device may generate a control signal and a response signal in response to the audio signal. As discussed previously, the control signal and the response signal are generated based on the verbal commands recognized by the second computing device and the first computing device. For example, the verbal commands include words uttered by the operator that are analyzed and recognized by the voice application software installed in the second computing device. In some examples, the control signal in the form of control commands is generated by the voice application software or the proprietary control software in response to recognizing the words spoken by the operator. At step 1006, the first computing device controls a conveyor and associated conveyor parameters based on the control signal. At step 1008, the first computing device transmits the response signal to the second computing device as one of a speech output or a visual output indicating the information relating to the response for the verbal command to the operator. In some examples, the response signal in the form of visual interactive screen and audio/speech output is generated based on the words recognized by the voice application software. In some examples, the visual interactive screen includes list of options and queries generated based on a current location of the second computing device as discussed previously in detail in conjunction FIGS. 3-9. In some examples, the response signal may be in the form of the audio/speech output along with the list of options and queries generated at the interactive screen such that the operator can simultaneously hear and read the options and queries. In this regard, the operator may respond to the options and queries, by spoken words uttered through the headset worn by the operator.

According to an embodiment, when the current location of the second computing device is within a predetermined range from the first computing device, then a first control signal and a first response signal is issued by the first computing device. The first control signal is a command signal to one of activate, deactivate, or modify control settings of the conveyor. In some examples, a confirmation may be requested to the operator as a query before issuing the first control signal. The confirmation may be provided as a speech input or a text input in response to the query. The first response signal indicates a status information of the conveyor after issuing the first control signal. A confirmation of the information encrypted in the audio signal before issuing the first control signal, wherein the confirmation is provided as one of a speech input or a text input. According to another embodiment, when the current location of the second computing device is not within a predetermined range from the first computing device, an error information is generated at the second computing device. The error information, for example, includes location information of the one or more components identified in the audio signal, the current location of the second computing device, and a distance information between the one or more components and the second computing device. For example, let us assume that the second computing device and the conveyor is at a distance, say 1 mile, the second computing device compares it to the predetermined distance to verify if the first control signal can be issued. If the predetermined distance is set to 2 miles, then the first control signal can be issued to the conveyor. For example, let us assume that the second computing device and the conveyor is at a distance, say 10 miles, the second computing device may generate the error information stating "Distance to the conveyor A123 is 8 miles far from the current location. Turn right and head south to reach the conveyor A123". Such error information is generated to inform the operator that he is far from line of sight from the conveyor.

According to an embodiment, as described in the flowchart of FIG. 11, the response signal may be generated by the first computing device in response to the words uttered through the headset. Such response signal may be received at the second computing device at step 1102 in response to the words spoken by the operator. The response signal, for example, includes information relating to the conveyor and components associated with the conveyor and the first computing device. The information relating to the conveyor and the components comprise status information, location information, configuration settings, measurements recorded in the data store of the first computing device, commissioning information or acknowledgement information. At steps, 1104 and 1106, a visual output or a speech output based on such information is generated with a list of options and queries. In some examples, the visual output displayed at the visual interactive screen and the speech output at the headset worn by the operator representing the information encrypted in the response signal. Further, at step 1108, the operator responds to the list of options and the queries through the audio interface, for example, the headset, which is received in the form the audio signal at the second computing device. For example, in response to the information displayed at the visual interface, the audio signal is received from the operator which includes spoken words transmitted to the first computing device at step 1110. The spoken words are recognized and interpreted by the second computing device or the first computing device to generate either the response signal or the control signal. According to an embodiment, the response signal or the control signal is generated based on a current location of the second computing device as discussed previously in detail in conjunction FIGS. 3-9. According to an embodiment, an optimal route information for the second computing device to reach a location of the first computing device is identified and transmitted to the second computing device based on the current location of the second computing device. In some examples, the optimal route information may be modified dynamically based on the current location of the second computing device. According to an embodiment, the location information of the one or more components on the conveyor may be transmitted as the response signal in response to the spoken words identified in the verbal command Therefore, the response signal may include location information along with the information associated with the conveyor in response to the spoken words by the operator. In this regard, the second computing device may be aware of the current location of the second computing device and the location of conveyor when controlling the conveyor using the verbal commands in order to ensure operational safety when controlling the conveyor.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

What is claimed is:

1. A system comprising:
   a first computing device; and
   a second computing device communicably coupled to the first computing device, wherein the first computing device is configured to:
   receive a transmission from the second computing device, the transmission comprises information relating to a verbal command spoken by an operator associated with the second computing device;
   generate a response signal in response to the transmission, wherein the response signal comprises information relating to a response for the verbal command,
   wherein the information is generated based on a location of the second computing device, and
   wherein generating the response signal comprises identifying an optimal route information for the second computing device to reach a location of the first computing device; and
   generate a control signal in response to the transmission and control a conveyor based on the control signal.

2. The system of claim 1, wherein the first computing device and the second computing device are communicably coupled via a communication terminal.

3. The system of claim 1, wherein the first computing device is configured to control the conveyor using audio signals received from a voice interface of the second computing device.

4. The system of claim 1, wherein the first computing device is configured to transmit the response signal to the second computing device as one of a speech output or a visual output indicating the information relating to the response for the verbal command to the operator.

5. The system of claim 1, wherein the second computing device comprises visual interface, voice interface, a conversion engine, memory, and a communication module.

6. The system of claim 5, wherein the conversion engine includes a speech-to-text (STT) modules and text-to-speech (TTS) modules.

7. The system of claim 1, wherein the second computing device is communicably coupled to a remote server, wherein the remote server is configured to maintain a table of IP addresses for the second computing device and use the IP addresses to identify a sender or recipient of a particular audio signal.

8. The system of claim 1, wherein the first computing device is configured to:
   transmit the optimal route information to the second computing device based on a current location of the second computing device; and
   dynamically modify the optimal route information based on the current location of the second computing device.

9. The system of claim 8, wherein the first computing device is configured to:
   retrieve a location information of one or more components on the conveyor identified in the verbal command;
   identify the optimal route information for the second computing device to reach the location of the one or more components based on the location information;
   transmit to the second computing device the optimal route information; and
   modify the optimal route information based on the current location of the second computing device.

10. The system of claim 1, wherein the first computing device is configured to:
    analyze the information in the transmission; and
    determine the location of the second computing device issuing the transmission, wherein when the location is within a predetermined range from the first computing device:
    issue a first control signal to one or more components associated with the conveyor identified in the transmission, wherein the first control signal is a command signal to one of activate, deactivate, or modify control settings of the conveyor; and
    issue a first response signal to the second computing device, wherein the first response signal indicates a status information of the conveyor after issuing the first control signal.

11. The system of claim 3, wherein the first computing device is configured to:
    analyze the information in the transmission; and
    determine the location of the second computing device issuing the transmission, wherein when the location is outside a predetermined range from the first computing device:
    issue the response signal to the second computing device indicating an error information comprising: (i) location information of one or more components associated with the conveyor and identified in the audio signals, (ii) the location of the second computing device, and (iii) a distance information between the one or more components and the second computing device.

12. The system of claim 4, wherein the first computing device is configured to display the response signal at the second computing device as the visual output in the form of a visual interactive screen with a list of options, wherein the list of options is selected by the operator by interacting with the second computing device via one of a speech input or a text input.

13. The system of claim 1, wherein the transmission is associated with a digital audio signal.

14. The system of claim 1, wherein the transmission comprises a request received from the second computing device.

15. A system comprising:
    a first computing device; and a second computing device communicably coupled to the first computing device and configured to:
- receive a response signal generated by the first computing device, wherein the response signal comprises information relating to a conveyor and components associated with the first computing device, and wherein the information relating to the conveyor and the components associated with the first computing device comprises an optimal route information for the second computing device to reach a location of the first computing device;
- generate a visual output or a speech output based on the information encrypted in the response signal;
- output the visual output or the speech output at a visual interface or a voice interface representing the information encrypted in the response signal;
- receive an audio signal through the voice interface from an operator associated with the second computing device in response to the information displayed at the visual interface, wherein the audio signal comprises information relating to a verbal command spoken by the operator; and
- transmit the audio signal to the first computing device.

16. The system of claim 15, wherein the second computing device is configured to:
- retrieve, from a data store, a first interactive screen from among a plurality of interactive screens associated with the information encrypted in the response signal;
- display, at a display associated with the second computing device, the first interactive screen, wherein the first interactive screen comprises a first list of options to be selected by the operator; and
- display, at the display associated with the second computing device, a second interactive screen with a second list of options retrieved based on the selection received on the first interactive screen, wherein the selection is provided through one of the visual interface or the voice interface.

17. The system of claim 15, wherein the second computing device is configured to:
- receive the speech output from the voice interface associated with the second computing device;
- retrieve an interactive screen with a list of options associated with the speech output; and
- display the interactive screen at the visual interface.

18. The system of claim 15, wherein the second computing device is configured to:
- receive the speech output from the voice interface associated with the second computing device;
- analyze the speech output and dynamically display words associated with the speech output at the visual interface, wherein a list of options is generated based on the words associated with the speech output;
- dynamically create an interactive screen with the list of options; and
- store the interactive screen as template associated with the speech output.

19. The system of claim 15, wherein the information relating to the conveyor and the components comprises status information, location information, configuration settings, measurements recorded in a data store of the first computing device, commissioning information or acknowledgement information.

* * * * *